(12) United States Patent
Hayashi et al.

(10) Patent No.: US 11,223,249 B2
(45) Date of Patent: Jan. 11, 2022

(54) ELECTRIC MOTOR

(71) Applicant: KOBE STEEL, LTD., Hyogo (JP)

(72) Inventors: Shumpei Hayashi, Hyogo (JP); Takashi Tokuyama, Hyogo (JP); Tsuyoshi Miyazaki, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 76 days.

(21) Appl. No.: 15/931,506

(22) Filed: May 13, 2020

(65) Prior Publication Data

US 2021/0359559 A1  Nov. 18, 2021

(51) Int. Cl.
*H02K 1/27* (2006.01)
*H02K 21/14* (2006.01)

(52) U.S. Cl.
CPC .......... *H02K 1/274* (2013.01); *H02K 1/2793* (2013.01); *H02K 21/14* (2013.01)

(58) Field of Classification Search
CPC ...... H02K 1/274; H02K 21/14; H02K 1/2793; H02K 1/2713
See application file for complete search history.

(56) References Cited

U.S. PATENT DOCUMENTS

| | | | |
|---|---|---|---|
| 2005/0127769 A1* | 6/2005 | Minagawa | H02K 21/24 310/156.32 |
| 2007/0080598 A1 | 4/2007 | Naruse | |
| 2009/0097003 A1 | 4/2009 | Cox et al. | |
| 2010/0187933 A1 | 7/2010 | Yamamoto et al. | |
| 2012/0092641 A1 | 4/2012 | Cox et al. | |
| 2017/0244293 A1 | 8/2017 | Kanda et al. | |
| 2019/0173342 A1* | 6/2019 | Chmelicek | H02K 1/2713 |

FOREIGN PATENT DOCUMENTS

| | | |
|---|---|---|
| JP | 2007-104819 A | 4/2007 |
| JP | 2007-143335 A | 6/2007 |
| JP | 2008-104278 A | 5/2008 |
| JP | 2009-011023 A | 1/2009 |
| JP | 2009-089595 A | 4/2009 |
| JP | 2015-027160 A | 2/2015 |
| JP | 2017-147904 A | 8/2017 |

* cited by examiner

*Primary Examiner* — Thomas Truong
(74) *Attorney, Agent, or Firm* — Studebaker & Brackett PC

(57) ABSTRACT

An electric motor includes an armature and a mover. The armature includes an armature coil. The mover includes a plurality of pole blocks each including an iron core disposed to face the armature and a plurality of permanent magnets which surround the iron core such that a surface of the iron core, which faces the armature, is open. The plurality of permanent magnets in each pole block are disposed such that magnetic poles thereof facing the iron core are equal in polarity.

10 Claims, 19 Drawing Sheets

ELECTRIC MOTOR

BACKGROUND OF INVENTION

Technical Field

The present invention relates to an electric motor including a mover equipped with permanent magnets.

Background Art

Patent Document 1 discloses a rotating electric machine including a rotor which has a center shaft and includes a plurality of plate-shaped permanent magnets disposed radially with respect to the center shaft in the circumferential direction and iron cores disposed between the permanent magnets. In this rotating electric machine, two permanent magnets are attached to each iron core such that magnetic poles thereof equal in polarity face the iron core.

Patent Document 1: JP 2015-27160 A

SUMMARY OF INVENTION

For improving the output of an electric motor, it is necessary to increase the number of magnetic fluxes generated in the gap between the armature and the mover. However, in the rotating electric machine disclosed in Patent Document 1, the two permanent magnets attached to each iron core are the only factor which contributes to the number of fluxes that pass through the iron core, and there are limitations in increasing the number of fluxes.

A main object of the present invention, which has been achieved in view of these circumstances, is to provide an electric motor capable of overcoming that problem.

In order to solve the problem(s), an electric motor in an aspect of the present invention includes:

an armature including an armature coil; and a mover including a plurality of pole blocks each including an iron core disposed to face the armature and a plurality of permanent magnets which surround the iron core such that a surface of the iron core, which faces the armature, is open, and the plurality of permanent magnets in each pole block are disposed such that magnetic poles thereof facing the iron core are equal in polarity.

In this aspect, the plurality of pole blocks may be disposed such that magnetic poles thereof differing in polarity are arranged periodically.

In the above aspect, the plurality of pole blocks may be disposed such that polarities of the pole blocks are inverted one by one in a moving direction of the mover.

In the above aspect, the plurality of pole blocks may be disposed such that the polarities of the pole blocks are inverted one by one in a direction which crosses the moving direction.

In the above aspect, the plurality of pole blocks may be disposed such that magnetic poles equal in polarity are arranged in a direction which crosses the moving direction.

In the above aspect, each of the pole blocks may be configured of the iron core and the permanent magnets attached respectively to five surfaces of the iron core, the iron core having a rectangular parallelepiped shape, the moving direction may be a linear direction, and the plurality of pole blocks may be arranged in the moving direction such that each of the magnetic poles faces in one direction which crosses the moving direction.

In the above aspect, each of the pole blocks may be configured of the iron core and the permanent magnets attached respectively to five surfaces of the iron core other than an outer circular-arc surface, the iron core having a shape of a fan-shaped plate from which a tip portion is removed, the mover may have a rotating shaft and be rotatable in the moving direction which is a circular direction the center of which is the rotating shaft, and the plurality of pole blocks may be arranged in the moving direction such that each of the magnetic poles faces outward in a radial direction of the rotating shaft.

In the above aspect, each of the pole blocks may be configured of the iron core and the permanent magnets attached respectively to five surfaces of the iron core other than one fan-shaped surface thereof, the iron core having a shape of a fan-shaped plate from which a tip portion is removed, the mover may have a rotating shaft and be rotatable in the moving direction which is a circular direction the center of which is the rotating shaft, and the plurality of pole blocks may be arranged in the moving direction such that each of the magnetic poles faces in one direction parallel with the rotating shaft.

In the present invention, it is possible to increase the number of fluxes generated in the gap between the armature and the mover as compared with those in conventional electric motors.

DETAILED DESCRIPTION OF THE INVENTION

Preferred embodiments of the present invention are described below by reference to the drawings.

Embodiment 1

In this embodiment, an explanation is given on a direct-acting electric motor of the transverse-direction flux type, which includes: a mover configured of a plurality of pole blocks each configured of an iron core having a rectangular parallelepiped shape and permanent magnets attached respectively to five surfaces of the iron core, the pole blocks being arranged in both a moving direction which is a linear direction, and a transverse direction that crosses the moving direction; and an armature disposed to face the mover.

Figure 1:
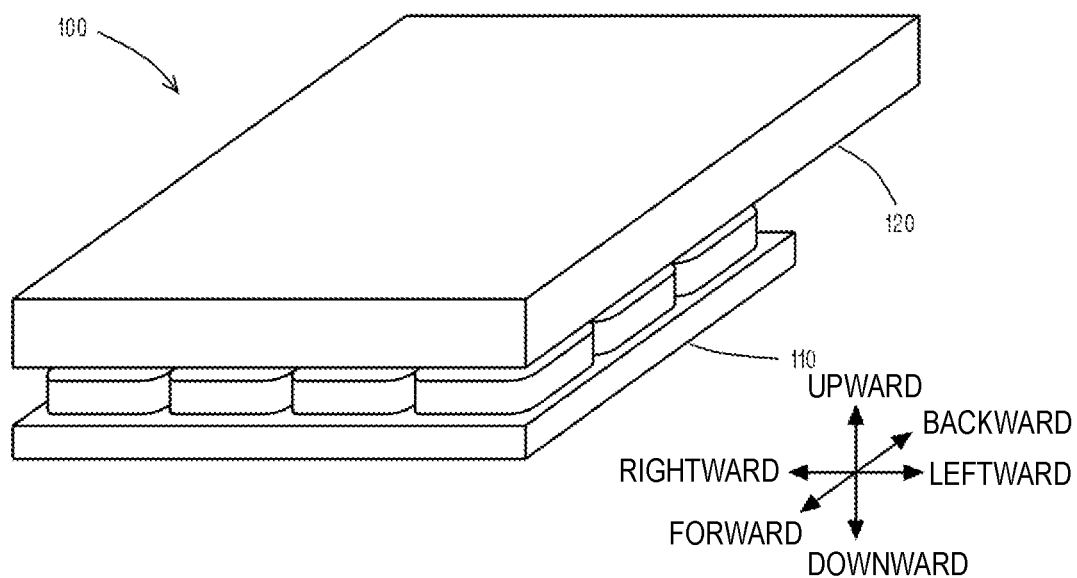
FIG. 1 is a slant view of the configuration of a direct-acting electric motor in embodiment 1.

FIG. 1 is a slant view of the configuration of the direct-acting electric motor in this embodiment. This direct-acting electric motor 100 includes an armature 110 and a mover 120. In the following description, the moving direction of the mover 120 is referred to as "forward/backward direction", the direction along which the armature 110 and the mover 120 are arranged is referred to as "upward/downward direction", and the horizontal direction perpendicular to the moving direction is referred to as "transverse direction (leftward/rightward direction)".

Figure 2:
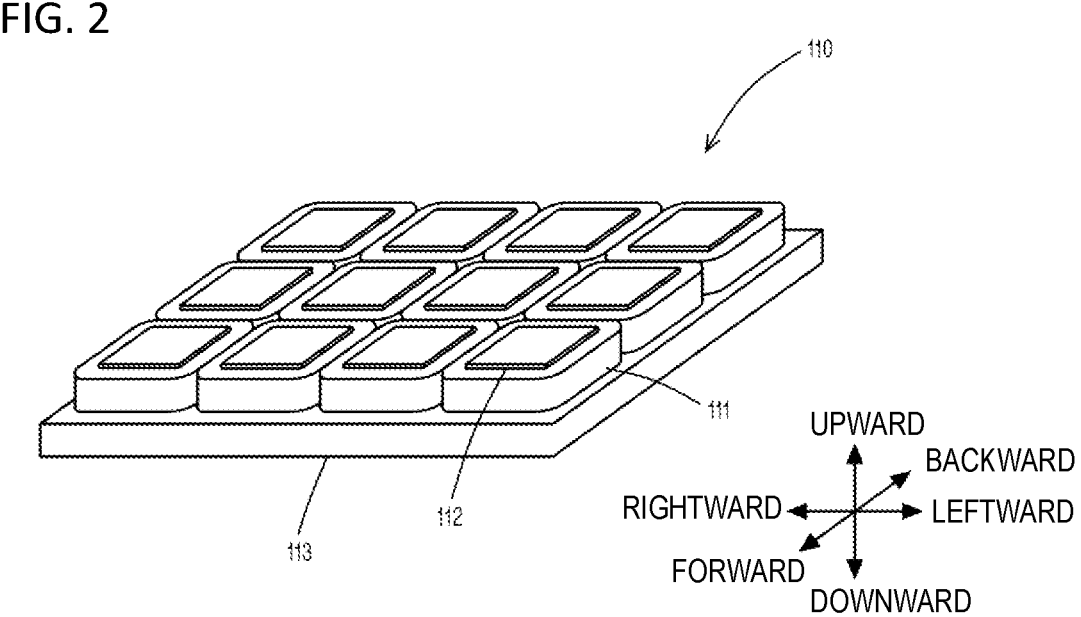
FIG. 2 is a slant view of the configuration of an armature of the direct-acting electric motor in embodiment 1.

The configuration of the armature 110 is described with reference to FIG. 2. FIG. 2 is a slant view of the configuration of the armature. The armature 110 includes armature coils 111, teeth parts 112, and a yoke part 113. The yoke part 113 has a horizontal plate shape, and the plurality of teeth parts 112 arranged in rows in both the forward/backward direction and the transverse direction protrude upward from the upper surface of the yoke part 113.

The yoke part 113 and the teeth parts 112 are integrally formed to constitute an armature member 115. This armature member 115 is constituted of a soft-magnetic material, such as soft iron or a soft ferrite. Each of the teeth parts 112 has a rectangular parallelepiped shape, and an armature coil 111 is formed by winding a conductor wire in each of the teeth parts 112. Twelve armature coils 111 in total are disposed, in four rows in the transverse direction, each row including three armature coils 111.

Figure 3:
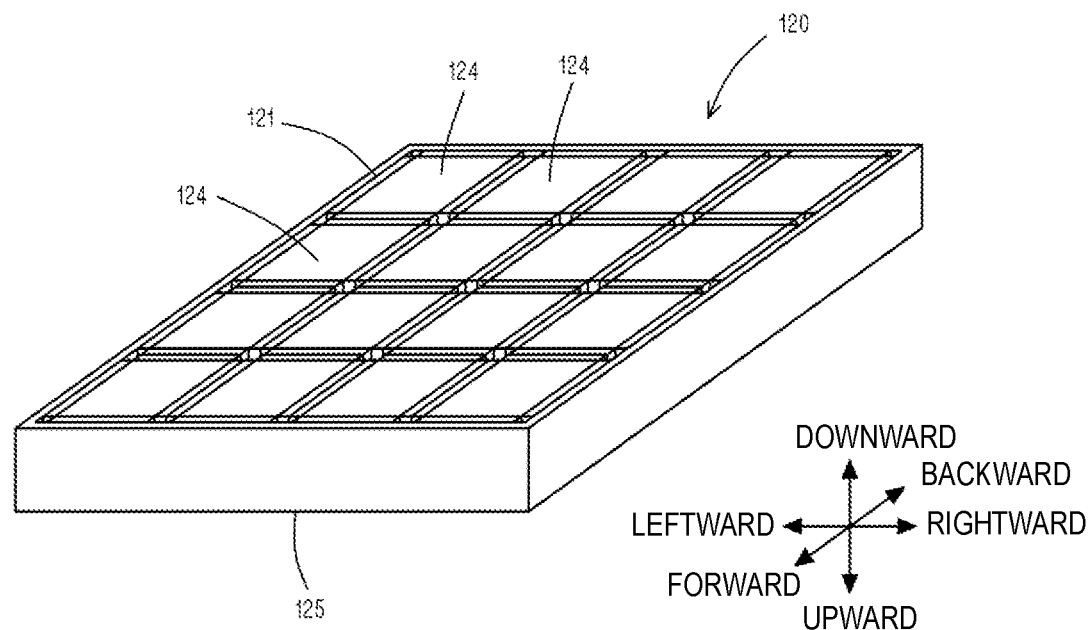
FIG. 3 is a slant view of the configuration of a mover of the direct-acting electric motor in embodiment 1.

Next, the configuration of the mover 120 is described. As shown in FIG. 1, the mover 120 is disposed over the armature 110. FIG. 3 is a slant view of the configuration of the mover. As shown in FIG. 3, the mover 120 has a plate shape extending in horizontal directions. This mover 120 includes a plurality of pole blocks 121, and these pole blocks 121 are arranged in both the forward/backward direction and the transverse direction to constitute a matrix structure.

Figure 4:
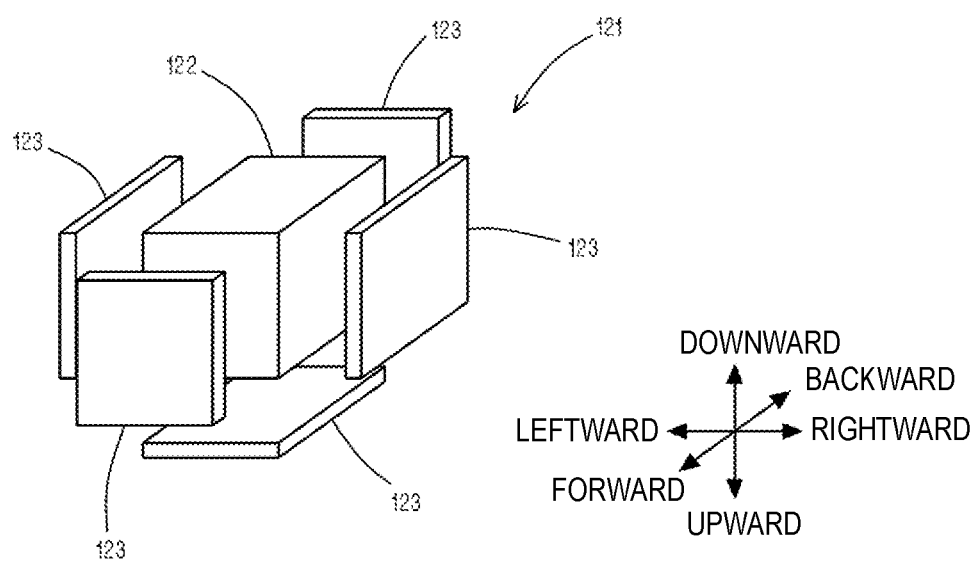
FIG. 4 is an exploded slant view of the configuration of a pole block of the direct-acting electric motor in embodiment 1.

FIG. 4 is an exploded slant view of the configuration of a pole block 121. The pole block 121 includes an iron core 122 which is a soft-magnetic material having a rectangular parallelepiped shape, and five permanent magnets 123 having a plate shape. Each of the permanent magnets 123 has a main surface having a size which is the same as or slightly larger than the corresponding surface of the iron core 122, and is attached to the surface of the iron core 122 so as to hide the surface of the iron core 122. Such permanent magnets 123 are attached to five surfaces of the iron core 122. That is, the permanent magnets 123 are attached to the iron core 122 so as to surround the iron core 122, with one surface of the core 122 remaining open. Each of the permanent magnets 123 is disposed such that the magnetic poles thereof facing the iron core 122 are equal in polarity. The open surface of the iron core 122 is a mover pole 124. As described below, the mover pole 124 has the same polarity as those in the surfaces of the permanent magnets 123 each facing the iron core 122. Those surfaces of the permanent magnets 123 each facing outward (the surfaces on the side opposite to the iron core 122) have the polarity opposite to that of the mover pole 124.

Reference is made to FIG. 3. The pole blocks 121 each having a rectangular parallelepiped shape are connected to each other such that surfaces of one pole block 121 are in contact with surfaces of other pole blocks 121. In any two adjoining pole blocks 121, the mover poles 124 differ in polarity from each other. That is, the pole blocks 121 are disposed in a matrix arrangement such that polarity inversion occurs alternately over the mover poles 124. Because of this, in two adjoining pole blocks 121, one of the bonding surfaces is a south (S) pole and the other is a north (N) pole. The two adjoining pole blocks 121 hence attract each other by magnetic force. It is therefore possible to easily dispose the plurality of pole blocks 121 in the matrix arrangement.

The structure including the plurality of pole blocks 121 thus arranged is encased in a yoke 125 constituted of a soft-magnetic material having a rectangular-parallelepiped box shape. Consequently, the magnetic poles of the pole blocks 121 other than the mover poles 124 are not exposed, and hence, magnetic paths are formed within the yoke 125.

The pole blocks 121 disposed in the arrangement described above are disposed such that the mover poles 124 face downward and the four lateral surfaces of each pole block 121 face forward, backward, rightward, and leftward, respectively. That is, polarity inversion occurs one by one over the mover poles 124 in the moving direction and in the transverse direction.

Figure 5:
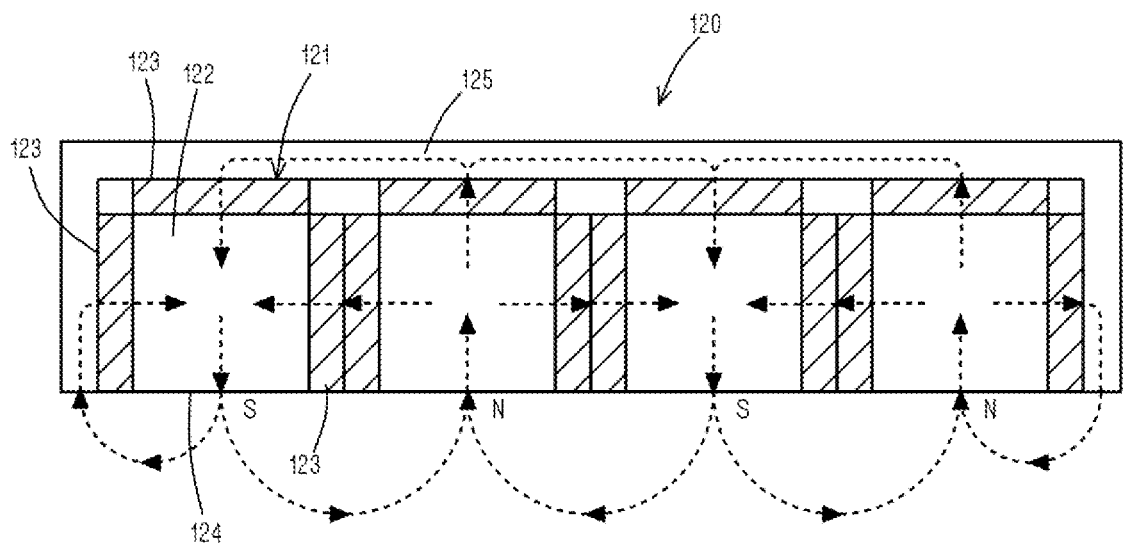
FIG. 5 is a cross-sectional front view for explaining magnetic paths in the mover of the direct-acting electric motor in embodiment 1.

FIG. 5 is a cross-sectional front view of the mover 120. In FIG. 5, the arrows indicate magnetization directions, and the polarity is S→N. Each iron core 122 is magnetized by the permanent magnets 123 surrounding the iron core 122. Magnetic fluxes that come out of the permanent magnets 123 in which the S poles face an iron core 122 travel through the iron core 122. Since five surfaces of the iron core 122 have the permanent magnets 123 attached thereto, the magnetic fluxes that come out of each of the five permanent magnets travel through the inside of the iron core 122, go downward, and come out through the mover pole 124 into the outside space (gap between the mover 120 and the armature 110). The magnetic fluxes separate radially and enter the inside of the iron cores 122 of adjoining pole blocks 121 through the mover poles 124 thereof having an N pole (or through the yoke 125 in the case where the yoke 125 is an adjoining member). Magnetic fluxes from all the adjoining pole blocks 121 enter the mover pole 124 having an N pole. Since the N poles of the permanent magnets face this iron core 122, the magnetic fluxes travel through the inside of the iron core 122, separate into forward, leftward, rightward, backward, and upward magnetic fluxes, and enter the permanent magnets 123. The magnetic fluxes travel from the permanent magnets 123 disposed respectively on the forward, leftward, rightward, and backward sides of the iron core 122 to the adjoining permanent magnets 123 (with respect to a permanent magnet 123 adjoining the yoke 125, the magnetic fluxes travel therefrom to the yoke 125). Meanwhile, the magnetic fluxes which come out of the permanent magnet 123 disposed on the upward side of the iron core 122 travel through the yoke 125 and enter the upper-side permanent magnets 123 of adjoining pole blocks 121.

Each mover pole 124 has the same polarity as those in the surfaces of the permanent magnets 123 which face the iron core 122 including the mover pole 124. That is, in the case where the S poles of permanent magnets 123 face an iron core 122, the mover pole 124 of this iron core 122 is an S pole. In the case where the N poles of permanent magnets 123 face an iron core 122, the mover pole 124 of this iron core 122 is an N pole.

Figure 6:
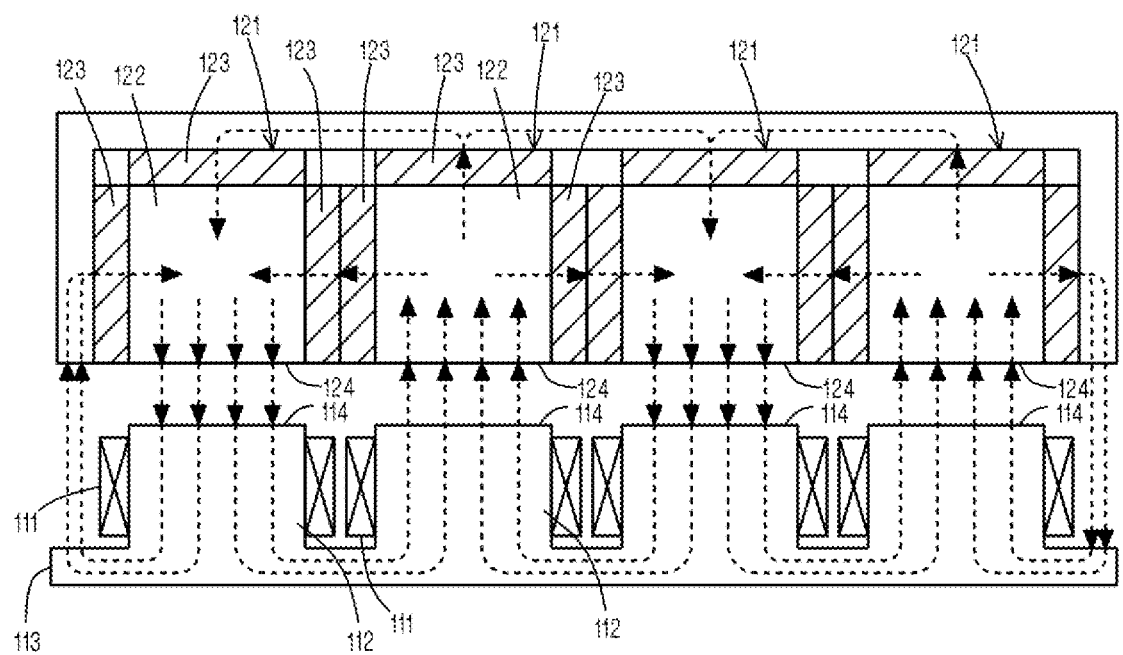
FIG. 6 is a cross-sectional front view for explaining magnetic paths generated by armature coils of the direct-acting electric motor in embodiment 1.

When a current is allowed to flow through the armature coils 111 in the direct-acting electric motor 100 having such configuration, a magnetic field is generated around each armature coil 111. FIG. 6 is a cross-sectional front view showing magnetic paths generated by the armature coils 111. Through two armature coils which adjoin in the transverse direction, a current flows in opposite directions. Thus, a magnetic path passing through the two teeth parts 112 on which these armature coils 111 are wound and through the yoke part 113 and the space between the teeth parts 112 is formed. In this armature 110, those surfaces of the teeth parts 112 which face the mover 120 are magnetic poles (armature poles 114). In the two adjoining teeth parts 112, the armature pole 114 of one teeth part 112 is an S pole and the armature pole 114 of the other teeth part 112 is an N pole.

The transverse-direction position of each armature pole 114 coincides with the transverse-direction position of the corresponding mover pole 124. That is, in the front view, the armature poles 114 respectively face the mover poles 124. Consequently, when a current is allowed to flow through each armature coil 111, the armature pole 114 and the mover pole 124 which corresponds thereto attract or repel each other by magnetic force (here, FIG. 6 shows magnetic paths occurring in the case where armature poles 114 and mover poles 124 attract each other). By controlling the current flowing through the armature coils 111, the magnetic fields generated by the armature coils 111 are changed to thereby move the mover 120 in the forward/backward direction.

The magnetic fluxes thus generated by the armature coils 111 pass through the inside of the mover 120. That is, the magnetic fluxes which have come out of an armature pole 114 having an S pole enter the mover pole 124 having an N pole and pass through all the permanent magnets 123 in contact with the iron core 122 including the mover pole 124. The magnetic fluxes which come out of the permanent magnets 123 enter permanent magnets 123 of the adjoining pole blocks 121, come out of the mover poles 124 having an S pole, and enter armature poles 114 having an N pole. That is, in the direct-acting electric motor in this embodiment, the magnetic fluxes generated by the armature 110 pass through all the permanent magnets 123 of the mover blocks 121. Since each iron core 122 in the mover 120 is surrounded by permanent magnets 123, the magnetic fluxes passing through the mover poles 124 are enhanced as compared with those in the mover of the conventional structure in which permanent magnets are attached to only two surfaces of each iron core. Consequently, the direct-acting electric motor 100 has an improved magnetic efficiency.

<Evaluation Test>

Figure 7:
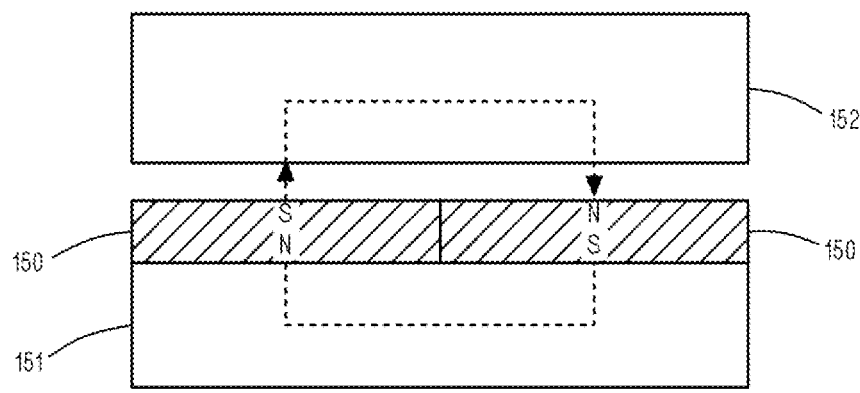
FIG. 7 is a cross-sectional view of the configuration of a mover in a conventional technique which was examined in an evaluation test.

The present inventors performed a test for evaluating the performance of a direct-acting electric motor 100 in this embodiment. In the test, a conventional mover (hereinafter referred to as "conventional technique") and the mover in this embodiment (hereinafter referred to as "the present technique") were examined for the density of magnetic fluxes generated in a gap by the mover, and they were compared for evaluation. First, the conventional technique is described. FIG. 7 is a cross-sectional view of the configuration of the mover in a conventional technique which was examined in this test. A plurality of permanent magnets 150 were disposed in a horizontal arrangement such that the magnetization directions thereof were the upward/downward direction and the magnetization directions of any adjoining permanent magnets 150 were opposite, and a soft-magnetic material 151 corresponding to a yoke was attached to the lower surfaces of the permanent magnets 150. Thus, a conventional mover was configured in a simplified manner. A soft-magnetic material 152 corresponding to the teeth parts of an armature was disposed over the permanent magnets 150 so as to leave a gap of 1 mm therebetween. The permanent magnets 150 each had a size of 13×8×3 [mm$^3$], and the number of the permanent magnets 150 was 6. The density of magnetic fluxes generated in the gap in this constitution was calculated at 0.95 T to 1.01 T. The density of magnetic fluxes generated in the gap in the configuration of the conventional technique was measured with a tester and, as a result, was found to be 0.96 T.

Meanwhile, a plurality of pole blocks 121 were produced and a mover was configured in the present technique. A soft-magnetic material corresponding to teeth parts was disposed over the mover so as to leave a gap of 1 mm therebetween as in the conventional technique. As the size of the permanent magnets, the lateral surfaces each had a size of 20×20×3 [mm$^3$] and the bottom surfaces each had a size of 25×25×4 [mm$^3$], the number of the permanent magnets was 30. The density of magnetic fluxes generated in the gap in this constitution was calculated at 1.59 T to 1.76 T. The density of magnetic fluxes generated in the gap in this configuration of the present technique was measured with a tester and, as a result, was found to be 1.74 T. It was thus found that the flux density in the gap in the present technique was about 1.7 times that in the conventional technique.

Embodiment 2

A direct-acting electric motor in this embodiment is a direct-acting electric motor of the vertical-direction flux type including a mover in which a plurality of pole blocks are disposed such that mover poles equal in polarity are arranged in the transverse direction and mover poles differing in polarity are arranged alternately in the moving direction.

Figure 8:
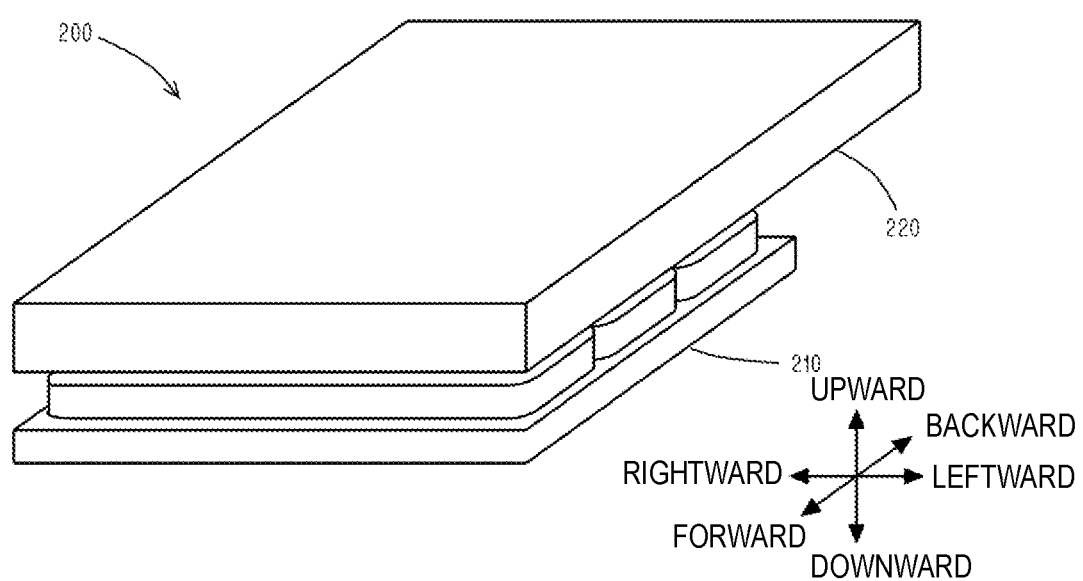
FIG. 8 is a slant view of the configuration of a direct-acting electric motor in embodiment 2.
Figure 9:
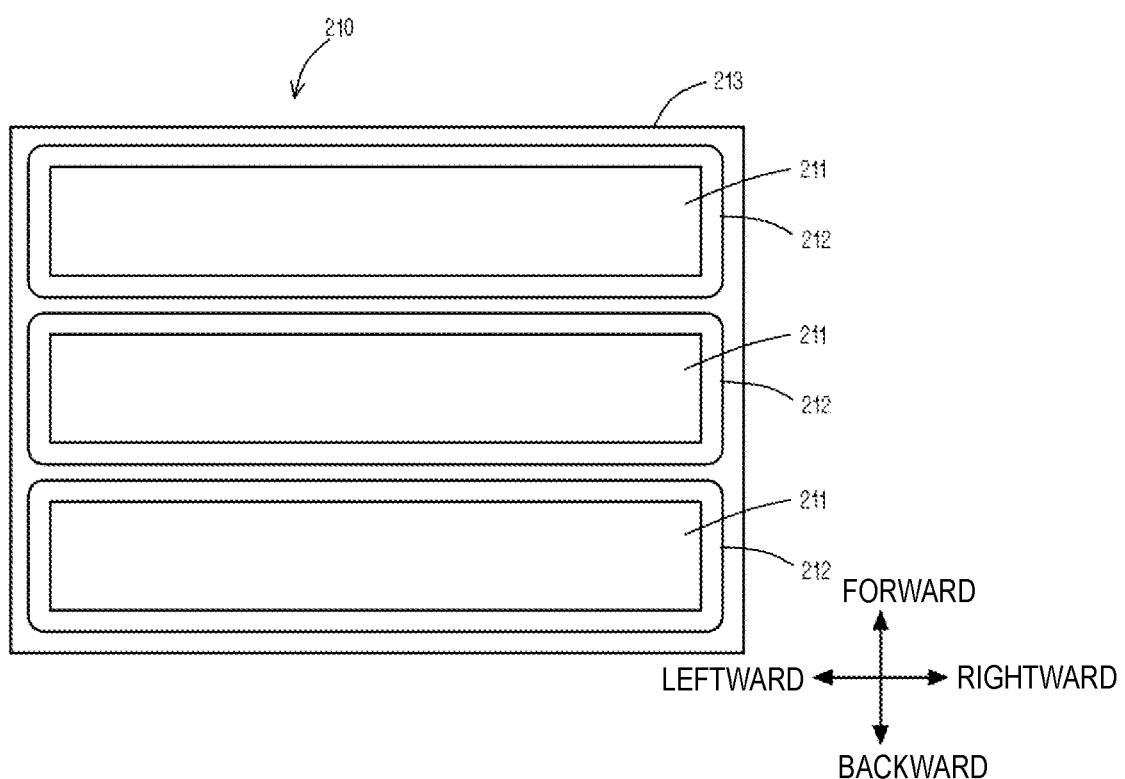
FIG. 9 is a plan view of the configuration of an armature of the direct-acting electric motor in embodiment 2.

FIG. 8 is a slant view of the configuration of the direct-acting electric motor in this embodiment, and FIG. 9 is a plan view of the configuration of the armature thereof. As shown in FIG. 8, the direct-acting electric motor 200 includes an armature 210 and a mover 220. As shown in FIG. 9, the armature 210 includes armature coils 211, teeth parts 212, and a yoke part 213. The yoke part 213 has a horizontal plate shape, and the teeth parts 212 which are elongated in the transverse direction protrude upward from the upper surface of the yoke part 213. The plurality of teeth parts 212 are disposed in a row in the forward/backward direction.

The yoke part 213 and the teeth parts 212 are integrally formed to constitute an armature member 215. This armature member 215 is constituted of a soft-magnetic material, such as soft iron or a soft ferrite. Each of the teeth parts 212 has a rectangular parallelepiped shape, and an armature coil 211 is formed by winding a conductor wire in each of the teeth parts 212. Three armature coils 211 are disposed in the forward/backward direction.

Figure 10:
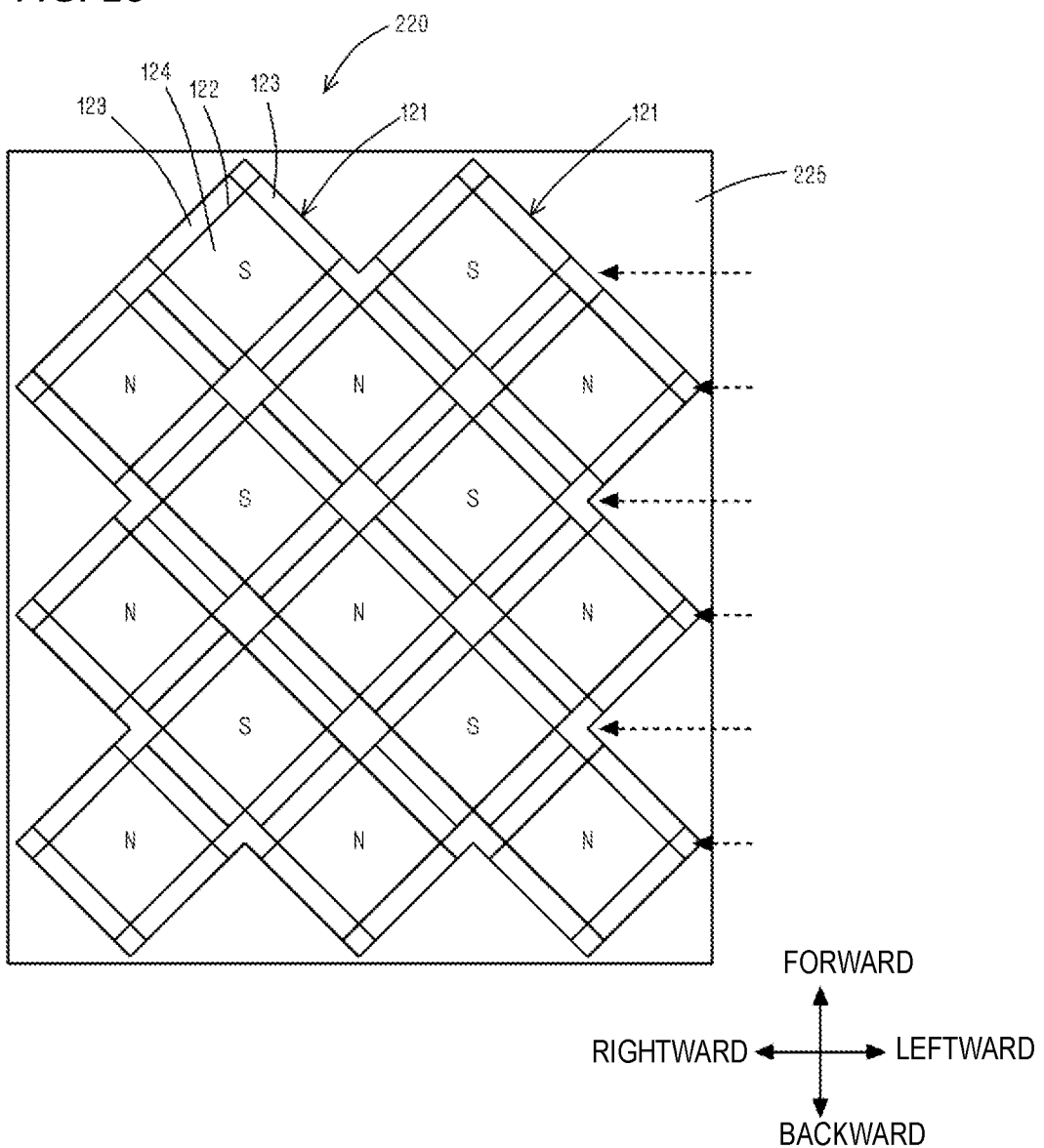
FIG. 10 is a plan view of the configuration of a mover of the direct-acting electric motor in embodiment 2.

Next, the configuration of the mover 220 is described. As shown in FIG. 8, the mover 220 is disposed over the armature 210. FIG. 10 is a plan view of the configuration of the mover 220. The mover 220 has a plate shape extending in horizontal directions and includes a plurality of pole blocks 121. The pole blocks 121 have the same configuration as the pole blocks 121 described above in embodiment 1. Hence, same constituent elements are designated by same numerals and explanations thereof are omitted.

As in embodiment 1, the pole blocks 121 each having a rectangular parallelepiped shape are connected to each other such that surfaces of one pole block 121 are in contact with surfaces of other pole blocks 121. In any two adjoining pole blocks 121, the mover poles 124 differ in polarity from each other. Each pole block 121 is disposed such that the mover pole 124 faces downward and one of the diagonals of the mover pole 124 extends in the forward/backward direction and the other diagonal extends in the leftward/rightward direction. That is, the mover 220 is configured such that the rhombic mover poles 124 are arranged in the forward/backward direction and the leftward/rightward direction. In the following description, a group of pole blocks 121 in which the rhombic mover poles 124 are arranged in a row in the transverse direction such that vertexes of each mover pole 124 meet vertexes of adjoining mover poles 124 is referred to as a "row" of pole blocks 121. All the mover poles 124 included in each row are equal in polarity. Any adjoining rows differ in polarity from each other. As shown in FIG. 10, the first row (most forward row) is S poles, the second row (second row from the forward side) is N poles, the third row is S poles, the fourth row is N poles, the fifth row is S poles, and the sixth row is N poles. In other words, in the mover poles 124 of the mover 220, polarity inversion occurs row by row in the forward/backward direction, and each row extending in the leftward/rightward direction is composed of mover poles 124 equal in polarity.

The structure including the plurality of pole blocks 121 thus arranged is encased in a yoke 225 constituted of a box-shaped soft-magnetic material. Consequently, the magnetic poles of the pole blocks 121 other than the mover poles 124 are not exposed, and hence, magnetic paths are formed within the yoke 225.

Figure 11:
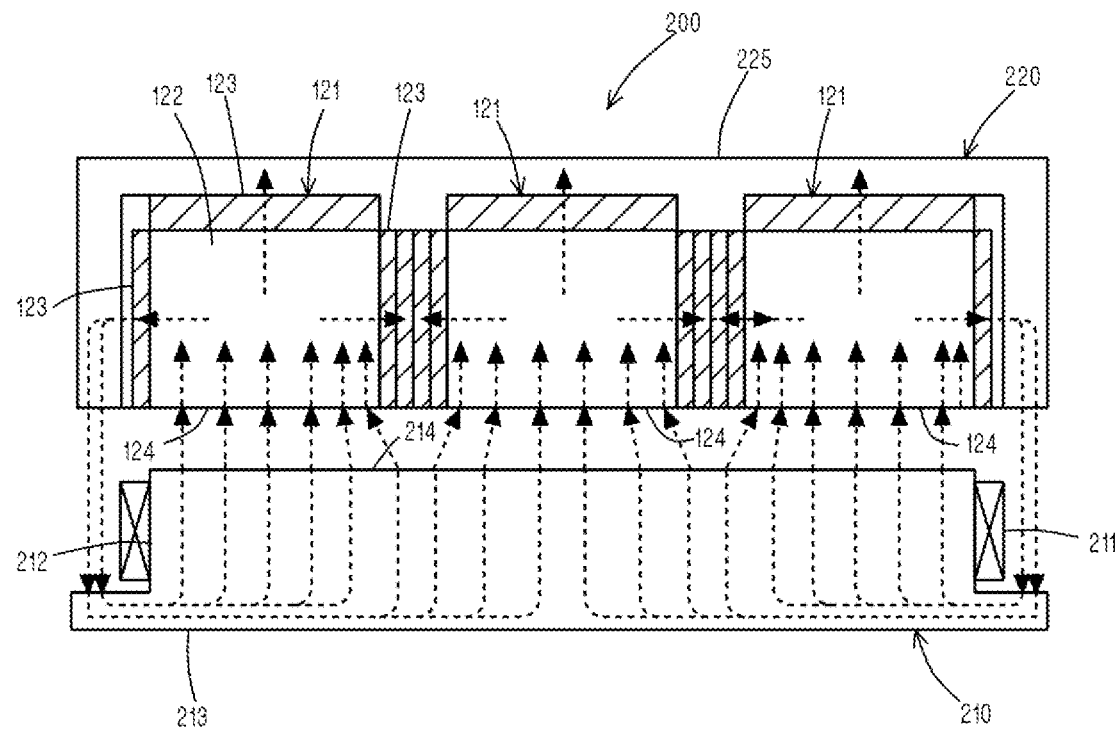
FIG. 11 is a cross-sectional front view showing magnetic paths generated by armature coils of the direct-acting electric motor in embodiment 2.

When a current is allowed to flow through the armature coils 211 in the direct-acting electric motor 200 having such configuration, a magnetic field is generated around each armature coil 211. FIG. 11 is a cross-sectional front view showing magnetic paths generated by armature coils 211. FIG. 11 shows a cross-section of a row in which the mover poles 124 are N poles. Circular magnetic paths are formed around each cross-section of the armature coil 211. In this armature 210, those surfaces of the teeth parts 212 which face the mover 220 are magnetic poles (armature poles 214).

When a current flows through the armature coils 211, the armature poles 214 and the mover poles 124 attract or repel each other by magnetic force. By controlling the current flowing through the armature coils 211, the magnetic fields generated by the armature coils 211 are changed to thereby move the mover 220 in the forward/backward direction. Magnetic fluxes which come out of an armature pole 214 having an S pole enter mover poles 124 having an N pole and pass through all the permanent magnets 123 in contact with the iron cores 122 including these mover poles 124. The magnetic fluxes which come out of the permanent magnets 123 enter permanent magnets 123 of adjoining pole blocks 121, come out of the mover poles 124 having an S pole, and enter armature poles 114 having an N pole. That is, in the direct-acting electric motor 200 in this embodiment, the magnetic fluxes generated by the armature 210 pass through all the permanent magnets 123 of the pole blocks 121. Since each iron core 122 in the mover 220 is surrounded by permanent magnets 123, the magnetic fluxes passing through the mover poles 124 are enhanced as compared with those in the mover of the conventional structure in which permanent magnets are attached to only two surfaces of each iron core. Consequently, the direct-acting electric motor 200 has an improved magnetic efficiency.

Embodiment 3

In this embodiment, an explanation is given on a direct-acting electric motor of the transverse-direction flux type, which includes: a mover configured of a plurality of pole blocks disposed such that mover poles differing in polarity are alternately arranged in the moving direction; and an armature disposed such that the mover is sandwiched between upper and lower portions of the armature.

Figure 12:
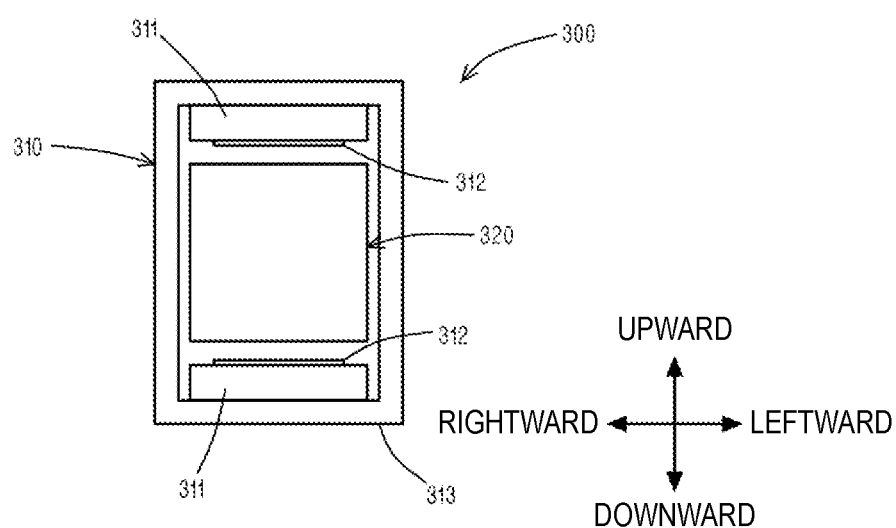
FIG. 12 is a front view of the configuration of a direct-acting electric motor in embodiment 3.
Figure 13:
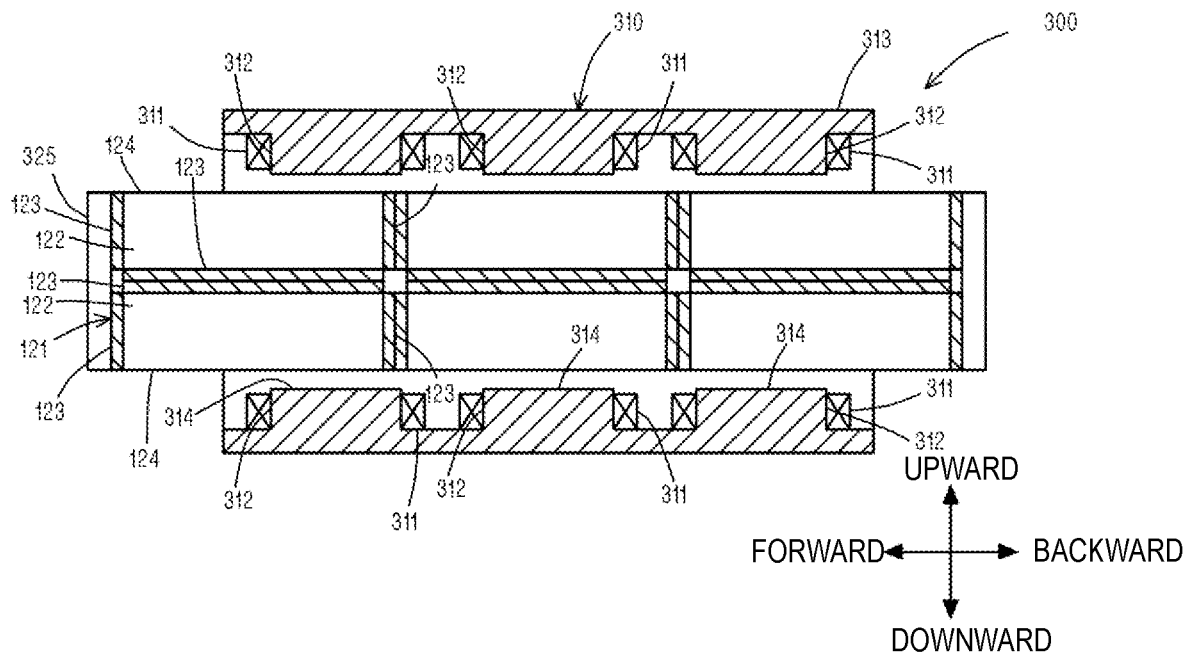
FIG. 13 is a partially cross-sectional side view of the configuration of the direct-acting electric motor in embodiment 3.

FIG. 12 is a front view of the direct-acting electric motor in this embodiment, and FIG. 13 is a partial cross-sectional side view thereof. The direct-acting electric motor 300 includes an armature 310 and a mover 320. As shown in FIG. 12, the armature 310 includes two sets of armature coils 311 disposed face to each other in the upward/downward direction, and the mover 320 is disposed therebetween.

The armature 310 includes the armature coils 311, teeth parts 312, and a yoke part 313. The yoke part 313 has a hollow rectangular prism shape, and the plurality of teeth parts protrude inward from the upper-side inner surface and lower-side inner surface of the hollow rectangular prism such that the teeth parts on each side are arranged in a row in the forward/backward direction.

The yoke part 313 and the teeth parts 312 are integrally formed to constitute an armature member 315. This armature member 315 is constituted of a soft-magnetic material, such as soft iron or a soft ferrite. Each of the teeth parts 312 has a rectangular parallelepiped shape, and an armature coil 311 is formed by winding a conductor wire in each of the teeth parts 312. Six armature coils 311 in total are disposed, three on the upper side and three on the lower side.

As shown in FIG. 13, the mover 320 includes a plurality of pole blocks 121 and has a structure in which these pole blocks 121 are arranged in rows in the forward/backward direction. The pole blocks 121 have the same configuration as the pole blocks 121 described above in embodiment 1. Hence, same constituent elements are designated by same numerals and explanations thereon are omitted.

The pole blocks 121 each having a rectangular parallelepiped shape are connected to each other such that the back surface of any forward-side pole block 121 is in contact with the front surface of the backward-side pole block 121. The mover poles 124 of any two adjoining pole blocks 121 differ in polarity from each other. That is, pole blocks 121 are arranged in a row in the forward/backward direction such that polarity inversion occurs alternately over the mover poles 124. Pole blocks 121 adjoin each other also in the upward/downward direction. Two pole blocks 121 are arranged in the upward/downward direction such that the mover pole 124 of the upper pole block 121 faces upward and the mover pole 124 of the lower pole block 121 faces downward. The mover poles 124 of these pole blocks 121 which adjoin in the upward/downward direction respectively have polarities opposite to each other. Because of this, in two such adjoining pole blocks 121, one of the surfaces is an S pole and the other is an N pole. The two adjoining pole blocks 121 hence attract each other by magnetic force. It is therefore possible to easily dispose the plurality of pole blocks 121 in rows.

The structure including a plurality of pole blocks 121 arranged in rows is encased in a yoke 325 constituted of a soft-magnetic material in the shape of a rectangular frame which is open in the upward/downward direction. Consequently, the magnetic poles of the pole blocks 121 other than the mover poles 124 are not exposed, and hence, magnetic paths are formed within the yoke 325.

In the pole blocks 121 disposed in the arrangement described above, the mover poles 124 face upward and downward and the mover poles 124 of each pair of pole blocks 121 arranged in the upward/downward direction respectively have polarities opposite to each other. That is, one of the mover poles 124 is an S pole and the other mover pole 124 is an N pole. Furthermore, in the pole blocks 121 arranged in a row in the forward/backward direction, polarity inversion occurs one by one over the mover poles 124 in the moving direction. That is, polarity of the upper mover poles 124 is inverted one by one in the moving direction and polarity of the lower mover poles 124 is also inverted one by one in the moving direction.

Figure 14:
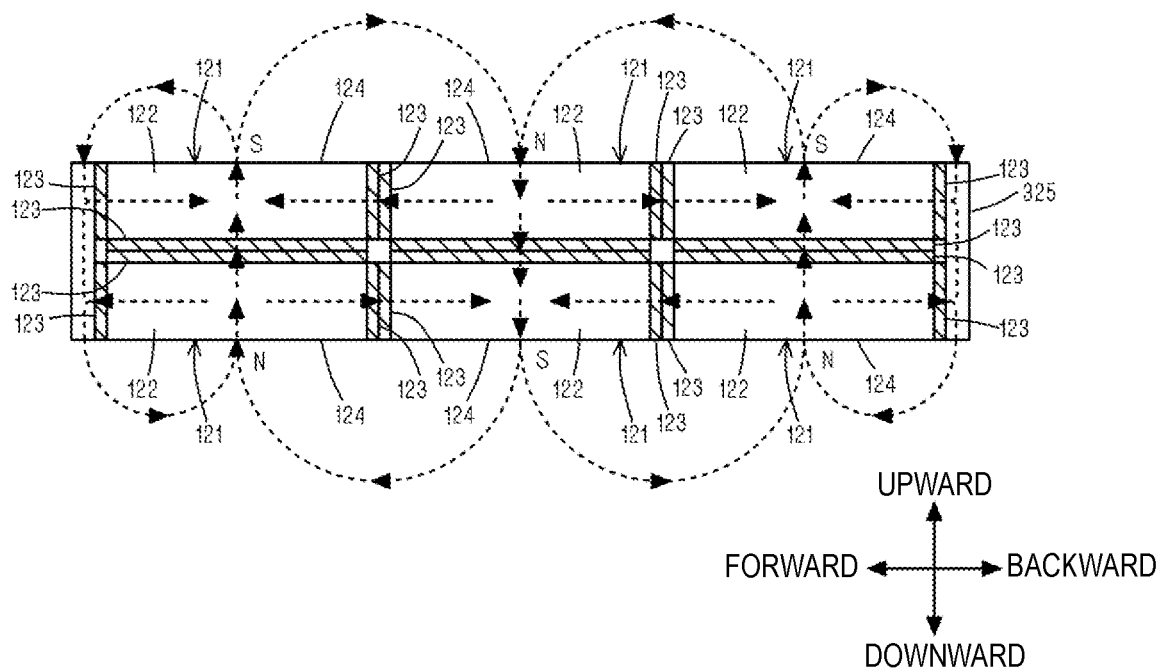
FIG. 14 is a cross-sectional side view of the configuration of a mover of the direct-acting electric motor in embodiment 3.

FIG. 14 is a cross-sectional side view of the mover 320. In FIG. 14, the arrows indicate magnetization directions, and the polarity is S→N. Each iron core 122 is magnetized by the permanent magnets 123 surrounding five surfaces of the core 122. Magnetic fluxes that come out of the permanent magnets 123 in which the S poles face an iron core 122 travel through the iron core 122. Since five surfaces of the iron core 122 have the permanent magnets 123 attached thereto, the magnetic fluxes that come out of the five permanent magnets 123 travel through the inside of the iron core 122. In the case of a pole block 121 disposed on the upward side, the magnetic fluxes travel upward and come out through the upward-side mover pole 124 into the outside space (upper gap between the mover 320 and the armature 310). The magnetic fluxes then radially separate into horizontal directions, and some of the separated magnetic fluxes enter the inside of the iron core 122 of an adjoining pole block 121 through the mover pole 124 (N pole) thereof. This iron core 122 receives magnetic fluxes from the two pole blocks 121 which adjoin the iron core 122 in the forward/backward direction. Since the N poles of permanent magnets 123 face this iron core 122, the magnetic fluxes further travel through the inside of the iron core 122 and separate into forward, leftward, rightward, and backward magnetic fluxes to enter the permanent magnets 123. The magnetic fluxes which come out of the permanent magnets 123 disposed respectively on the leftward side and rightward side of the iron core 122 enter the yoke 325. Meanwhile, the magnetic fluxes which come out of the permanent magnets 123 disposed respectively on the forward side and backward side of the iron core 122 take the following routes: in the case where either of the permanent magnets 123 is in contact with a permanent magnet 123 of an adjoining pole block 121, the magnetic fluxes therefrom enter this permanent magnet 123; and in the case where either of the permanent magnets 123 is in contact with the yoke 325, the magnetic fluxes therefrom enter the yoke 325. The magnetic fluxes which have entered the yoke 325 travel through the inside of the yoke 325 and enter a permanent magnet 123 of an adjoining pole block 121.

In an upward-side pole block 121 having a mover pole 124 having an N pole, magnetic fluxes travel also downward within the iron core 122 and enter the downward-side permanent magnet 123. The magnetic fluxes then enter the upward-side permanent magnet 123 of the pole block 121 underlying the permanent magnet 123. The underlying pole block 121 has a mover pole 124 having an S pole, and the S poles of permanent magnets 123 face the iron core 122. Because of this, magnetic fluxes which come out of these permanent magnets 123 travel downward and come out through the downward-side mover pole 124 into the outside space (upper gap between the mover 320 and the armature 310). The magnetic fluxes then radially separate in horizontal directions and enter the inside of the iron cores 122 of adjoining pole blocks 121 through the mover poles 124 (N poles) thereof.

Figure 15:
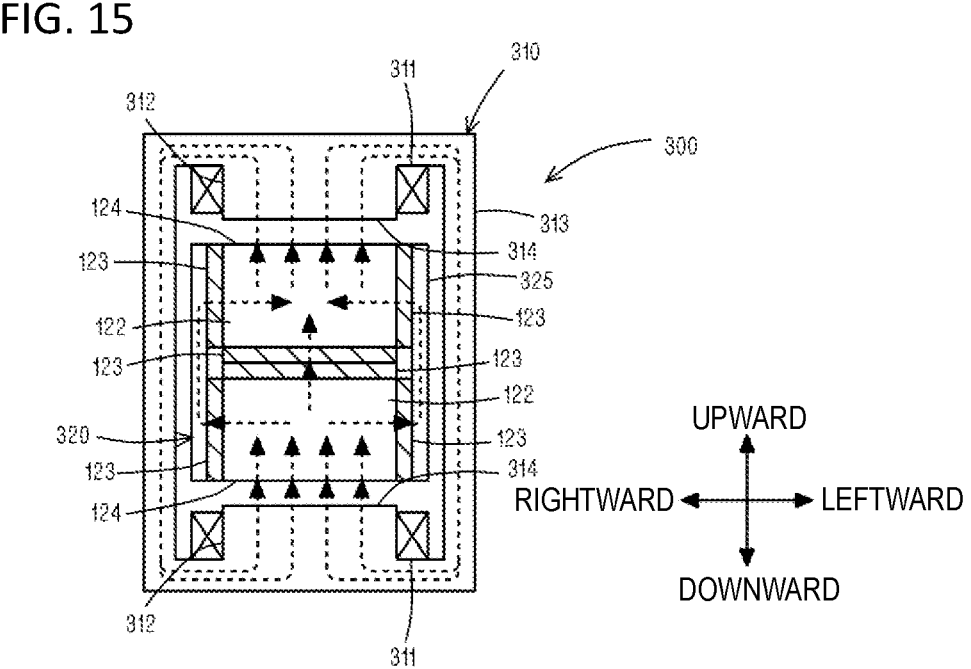
FIG. 15 is a cross-sectional front view showing magnetic paths generated by armature coils of the direct-acting electric motor in embodiment 3.

When a current is allowed to flow through the armature coils 311 in the direct-acting electric motor 300 having such configuration, a magnetic field is generated around each armature coil 311. FIG. 15 is a cross-sectional front view showing magnetic paths generated by armature coils 311. Circular magnetic paths are formed around each cross-section of the armature coil 311. In this armature 310, those surfaces of the teeth parts 312 which face the mover 320 are magnetic poles (armature poles 314).

When a current flows through the armature coils 311, the armature poles 314 and the mover poles 124 attract or repel each other by magnetic force. By controlling the current flowing through the armature coils 311, the magnetic fields generated by the armature coils 311 are changed to thereby move the mover 320 in the forward/backward direction. Magnetic fluxes which have come out of an armature pole 314 having an S pole enter mover poles 124 having an N pole and pass through all the permanent magnets 123 in contact with the iron cores 122 including these mover poles 124. The magnetic fluxes which come out of the permanent magnets 123 enter permanent magnets 123 of adjoining pole blocks 121, come out of the mover poles 124 having an S pole, and enter armature poles 314 having an N pole. That is, in the direct-acting electric motor 300 in this embodiment, the magnetic fluxes generated by the armature 310 pass through all the permanent magnets 123 of the pole blocks 121. Since each iron core 122 in the mover 320 is surrounded by permanent magnets 123, the magnetic fluxes passing through the mover poles 124 are enhanced as compared with those in the mover of the conventional structure in which permanent magnets are attached to only two surfaces of each iron core. Consequently, the direct-acting electric motor 300 has an improved magnetic efficiency.

Embodiment 4

In this embodiment, an explanation is given on a radial-gap electric motor including: a rotor configured of a plurality of pole blocks arranged in a moving direction which is a circular direction the center of which is a rotating shaft, the pole blocks each including an iron core having a shape of a fan-shaped plate from which a tip portion is removed and permanent magnets attached respectively to five surfaces of the iron core other than the outer circular-arc surface; and an armature disposed so as to surround the periphery of the rotor.

Figure 16:
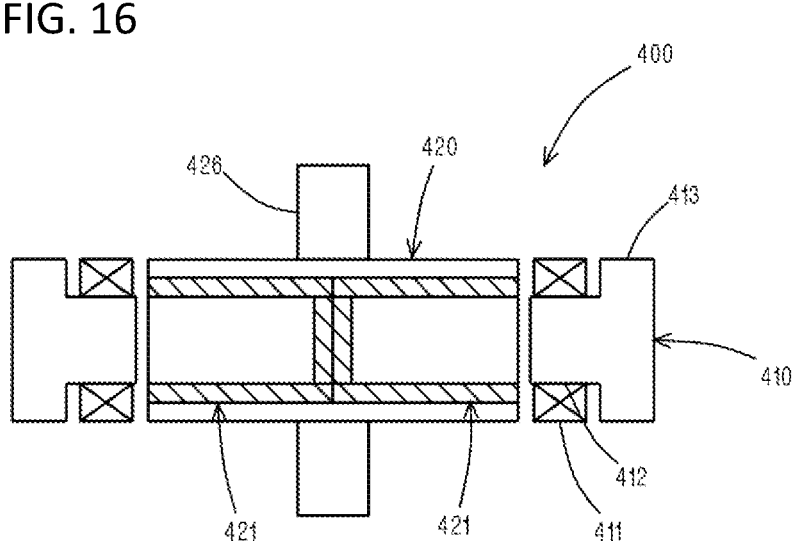
FIG. 16 is a cross-sectional side view of the configuration of a radial-gap electric motor in embodiment 4.
Figure 17:
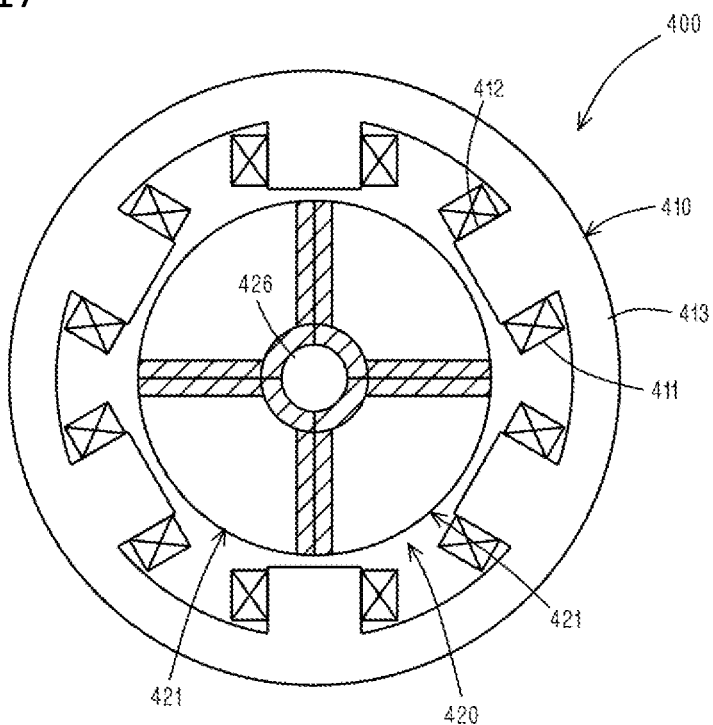
FIG. 17 is a cross-sectional plan view of the configuration of the radial-gap electric motor in embodiment 4.

FIG. 16 is a cross-sectional side view of the configuration of the radial-gap electric motor in this embodiment, and FIG. 17 is a cross-sectional plan view thereof. The radial-gap electric motor 400 includes an armature 410 and a rotor 420 as a mover. The rotor 420 has a rotating shaft 426 made of a soft-magnetic material and is rotatable on the rotating shaft 426. In the following description, the rotating direction of the rotor 420 is referred to as circumferential direction, the rotation radius direction of the rotor 420 is referred to as radial direction, and the longitudinal direction of the rotating shaft 426 is referred to as axial direction.

The armature 410 includes armature coils 411, teeth parts 412, and a yoke part 413. The yoke part 413 has an annular shape, and the plurality of teeth parts 412 protrude inward in the radial direction from the inner circumferential surface of the yoke part 413 such that the teeth parts 412 are arranged in equal intervals in the circumferential direction.

The yoke part 413 and the teeth parts 412 are integrally formed to constitute an armature member 415. This armature member 415 is constituted of a soft-magnetic material, such as soft iron or a soft ferrite. Each of the teeth parts 412 has a quadrilateral shape in a cross-sectional view, and an armature coil 411 is formed by winding a conductor wire in each of the teeth parts 412. Six armature coils 411 are disposed in the circumferential direction.

Next, the configuration of the rotor 420 is described. As shown in FIG. 17, the rotor 420 is disposed on the radial-direction inner side of the armature 410. The rotor 420 has a disk shape or cylinder shape. This rotor 420 includes a plurality of pole blocks 421 and has a structure in which these pole blocks 421 are arranged in the circumferential direction.

Figure 18:
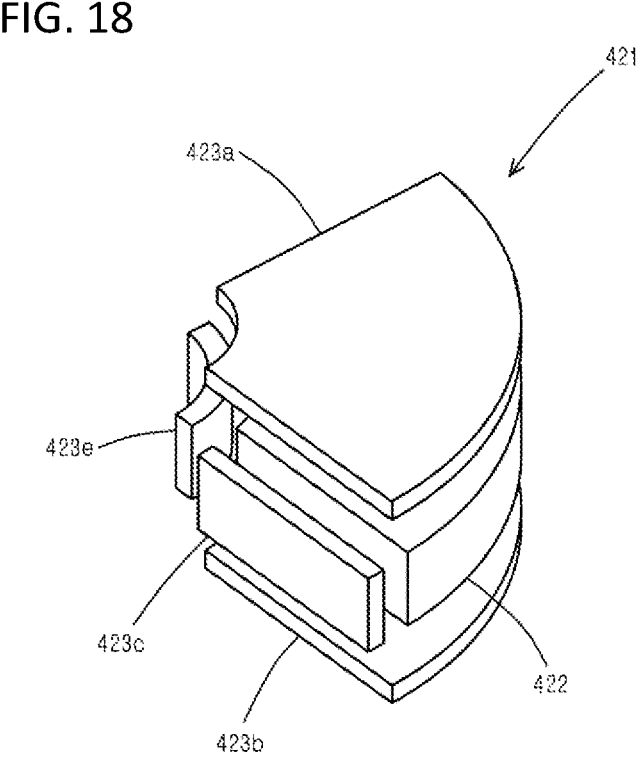
FIG. 18 is an exploded slant view of the configuration of a pole block of the radial-gap electric motor in embodiment 4.

FIG. 18 is an exploded slant view of the configuration of a pole block 421. The pole block 421 has a plate shape which, when viewed from the axial direction, has a fan shape from which a fan-shaped tip portion is removed (hereinafter referred to as "annular fan shape"). The pole block 421 includes: an iron core 422 constituted of a soft-magnetic material in the shape of a plate having an annular fan shape; and five plate-shaped permanent magnets 423a to 423e. The permanent magnets 423a and 423b each have main surfaces of an annular fan shape having a size equal to or slightly larger than that of one surface of the iron core 422, and are attached respectively to the two annular-fan-shape surfaces of the iron core 422 so as to hide these surfaces. The permanent magnets 423c and 423d each have a width equal to or slightly larger than the thickness of the iron core and are attached respectively to lateral surfaces of the iron core 422 so as to hide the surfaces (in FIG. 18, the permanent magnet 423d is not seen). The permanent magnet 423e has a circular-arc plate shape having an outer diameter equal to the diameter of the smaller, i.e., inner, circular-arc surface of the iron core 422, and is attached to the inner circular-arc surface of the iron core 422 so as to hide the surface. That is, the permanent magnets 423a to 423e are attached to the iron core 422 so as to surround the iron core 422, with the outer circular-arc surface remaining open. The permanent magnets 423a to 423e are disposed such that the magnetic poles thereof facing the iron core 422 are equal in polarity. The open outer circular-arc surface of the iron core 422 is a rotor pole 424. As described below, the rotor pole 424 has the same polarity as those in the surfaces of the permanent magnets 423a to 423e which face the iron core 422. Those surfaces of the permanent magnets 423a to 423e which face outward (the surfaces on the side opposite to the iron core 422) have the polarity opposite to that of the rotor pole 424.

Reference is made to FIG. 17. The pole blocks 421 each having an annular-fan-plate shape are connected to each other such that lateral surfaces thereof are in contact with each other. In any two adjoining pole blocks 421, the rotor poles 424 differ in polarity from each other. That is, the pole blocks 421 are arranged in the circumferential direction such that polarity inversion occurs alternately over the rotor poles 424. Because of this, in any two adjoining pole blocks 421, one of the surfaces is an S pole and the other is an N pole. The two adjoining pole blocks 421 hence attract each other by magnetic force. It is therefore possible to easily dispose the plurality of pole blocks 421 in the circumferential direction.

The structure including the plurality of pole blocks 421 thus arranged is sandwiched, from both sides in the axial direction, between yokes 425 each constituted of a disk-shaped soft-magnetic material. Consequently, the magnetic poles of the pole blocks 421 other than the rotor poles 424 are not exposed, and hence, magnetic paths are formed within the yokes 425.

As shown in FIG. 17, the rotor pole 424 of each iron core 422 has a surface width which is the same as the width of the teeth parts 412. Because of this, all the magnetic fluxes generated by the armature 410 go into and come out of the rotor poles 424 without leaking. The permanent magnets 423a and 423b and the yokes 425 are disposed so as to face the radial-direction inner surfaces of the armature coils 411. The spaces on the radial-direction inner side of armature coils 411 in conventional techniques were spaces not contributing to torque generation. In the radial-gap electric motor 400 in this embodiment, however, the permanent magnets 423a and 423b and the yokes 425 can be disposed in these spaces to attain an improvement in magnetic efficiency.

Figure 19:
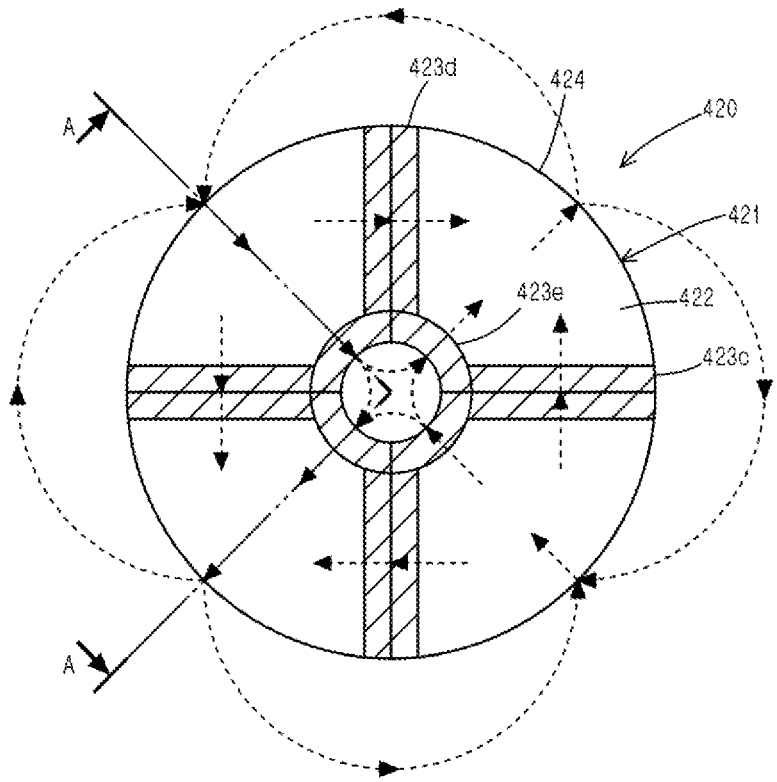
FIG. 19 is a cross-sectional plan view for explaining magnetic paths in a rotor of the radial-gap electric motor in embodiment 4.
Figure 20:
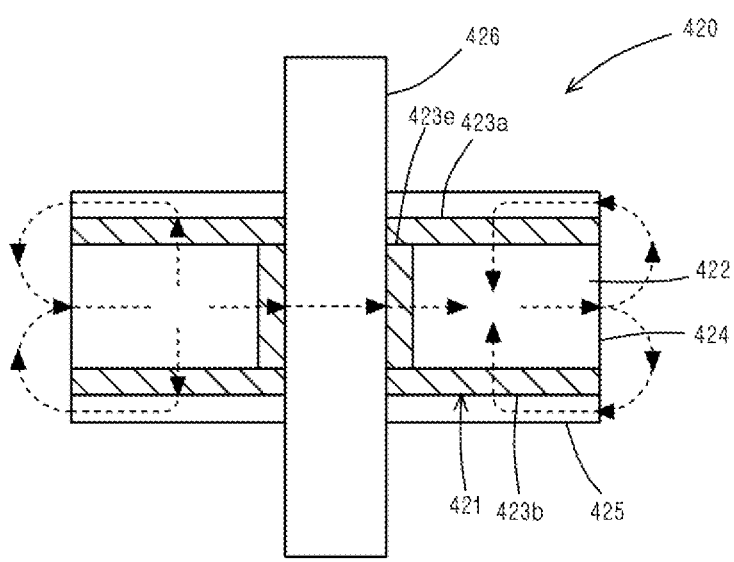
FIG. 20 is a cross-sectional view taken on the lines A-A in FIG. 19.

FIG. 19 is a cross-sectional plan view for explaining magnetic paths in and around the rotor 420, and FIG. 20 is a cross-sectional view taken on the lines A-A in FIG. 19. In FIG. 19 and FIG. 20, the arrows indicate magnetization directions, and the polarity is S→N. Each iron core 422 is magnetized by the permanent magnets 423a to 423e surrounding the iron core 422. Magnetic fluxes that come out of the permanent magnets 423a to 423e in which the S poles face an iron core 422 travel through the iron core 422. Since five surfaces of the iron core 422 have the permanent magnets 423a to 423e attached thereto, the magnetic fluxes that come out of the five permanent magnets 423a to 423e travel through the inside of the iron core 422, go outward in radial directions, and come out through the rotor pole 424 into the outside space (gap between the rotor 420 and the armature 410). The magnetic fluxes radially separate in the circumferential direction and the axial direction and enter the inside of the iron cores 422 of the adjoining pole blocks 421 through the rotor poles 424 thereof having an N pole. Magnetic fluxes from the two adjoining pole blocks 421 enter each of these iron cores 422. Since the N poles of the permanent magnets 423a to 423e face this iron core 422, the magnetic fluxes travel through the inside of the iron core 422, separate into axial-direction, circumferential-direction, and inward radial-direction magnetic fluxes, and enter the permanent magnets 423a to 423e. From the permanent magnets 423c and 423d, magnetic fluxes return to the adjoining permanent magnets 423c and 423d. The magnetic fluxes that come out of the permanent magnets 423a and 423b travel though the yokes 425 and enter the permanent magnets 423a and 423b of the adjoining pole blocks 421. Meanwhile, the magnetic fluxes that come out of the permanent magnet 423e travel through the rotating shaft 426 and enter the permanent magnets 423e of the adjoining pole blocks 421.

Each of the rotor poles 424 has the same polarity as those in the surfaces of the permanent magnets 423a to 423e which face the iron core 422 including the rotor pole 424. That is, in the case where the S poles of permanent magnets 423a to 423e face an iron core 422, the rotor pole 424 of this iron core 422 is an S pole. In the case where the N poles of permanent magnets 423a to 423e face an iron core 422, the rotor pole 424 of this iron core 422 is an N pole.

Figure 21:
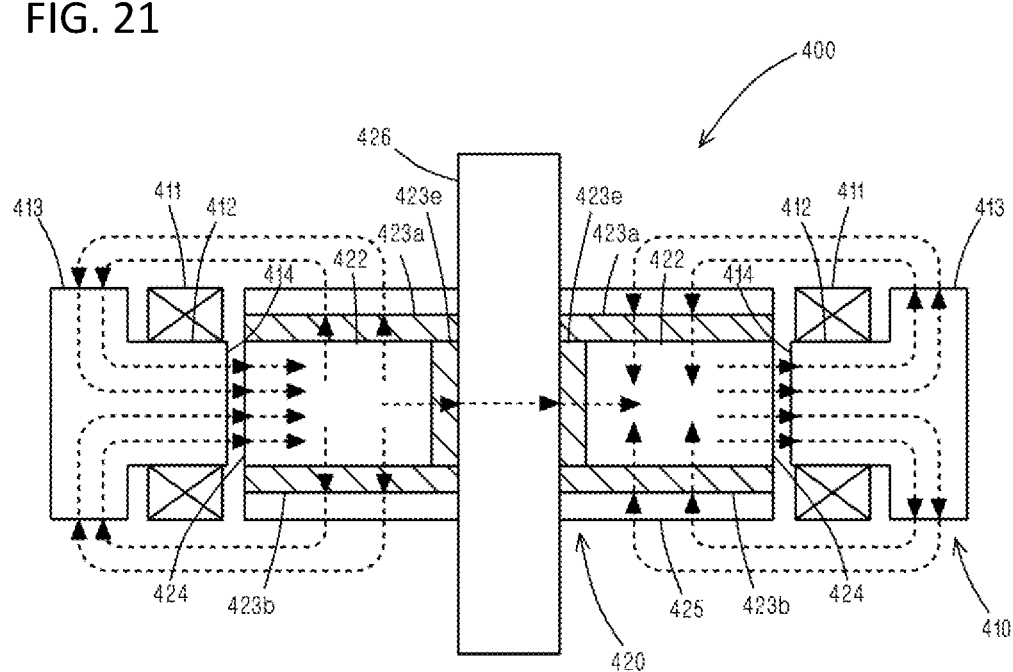
FIG. 21 is a cross-sectional view showing magnetic paths generated by armature coils of the radial-gap electric motor in embodiment 4.

When a current is allowed to flow through the armature coils 411 in the radial-gap electric motor 400 having such configuration, a magnetic field is generated around each armature coil 411. FIG. 21 is a cross-sectional view showing magnetic paths generated by armature coils 411. Circular magnetic paths are formed around each cross-section of the armature coil 411. In this armature 410, that surface of each teeth part 412 which faces the rotor 420 is a magnetic pole (armature pole 414).

Magnetic fluxes generated by an armature coil 411 enter an iron core 422 through the rotor pole 424 via the gap and pass through the permanent magnets 423a to 423d. The magnetic fluxes that have passed through the permanent magnets 423a and 423b come out through the yokes 425 into the air, pass through the outside of the armature coil 411, and enter the yoke part 413. Meanwhile, the magnetic fluxes that have passed through the permanent magnets 423c and 423d enter the iron cores 422 of the adjoining pole blocks 421 via permanent magnets 423c and 423d thereof, come out into the gap through the rotor poles 424 having an S pole, and enter the armature poles 414 having an N pole and facing the rotor poles 424. Some of the magnetic fluxes generated by the armature coil 411 may or may not pass through the permanent magnet 423e. Whether the magnetic fluxes pass through the permanent magnet 423e depends on the configuration of the radial-gap electric motor 400. For example, in the case where the iron core 422 has a small radial-direction dimension and the distance between the armature pole 414 and the permanent magnet 423e is short, then some of the generated magnetic fluxes that come out of the armature pole 414 are apt to pass through the permanent magnet 423e. In the case where the iron core 422 has a large radial-direction dimension and the distance between the armature pole 414 and the permanent magnet 423e is long, then the generated magnetic fluxes that come out of the armature pole 414 are less apt to pass through the permanent magnet 423e. In the radial-gap electric motor 400 in this embodiment, since each iron core 422 is surrounded by the permanent magnets 423a to 423e, the magnetic fluxes passing through the rotor poles 424 are enhanced as compared with those in the rotor of the conventional structure in which permanent magnets are attached to only two surfaces of each iron core. Consequently, the radial-gap electric motor 400 has an improved magnetic efficiency.

Embodiment 5

In this embodiment, an explanation is given on an axial-gap electric motor including: a rotor configured of a plurality of pole blocks arranged in a moving direction, which is a circular direction, around a rotating shaft as the center, the pole blocks each including an iron core having an annular-fan-plate shape and permanent magnets attached respectively to five surfaces of the iron core other than one main surface thereof; and a disk-shaped armature disposed so as to face the rotor in the axial direction.

Figure 22:
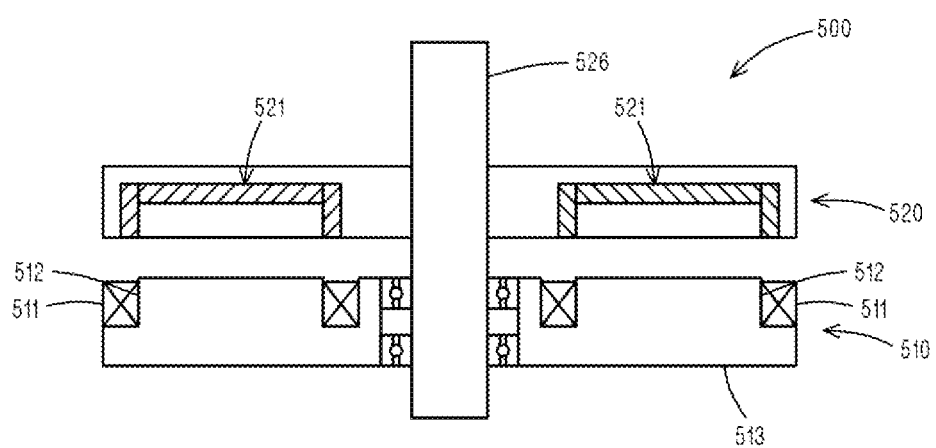
FIG. 22 is a cross-sectional side view of the configuration of an axial-gap electric motor in embodiment 5.

FIG. 22 is a cross-sectional side view of the configuration of the axial-gap electric motor in this embodiment. The axial-gap electric motor 500 includes an armature 510 and a rotor 520 as a mover. The rotor 520 has a rotating shaft 526 made of a soft-magnetic material and is rotatable on the rotating shaft 526. The armature 510 and the rotor 520 each have a disk shape and are disposed so as to leave a specific gap therebetween in the axial direction.

Figure 23:
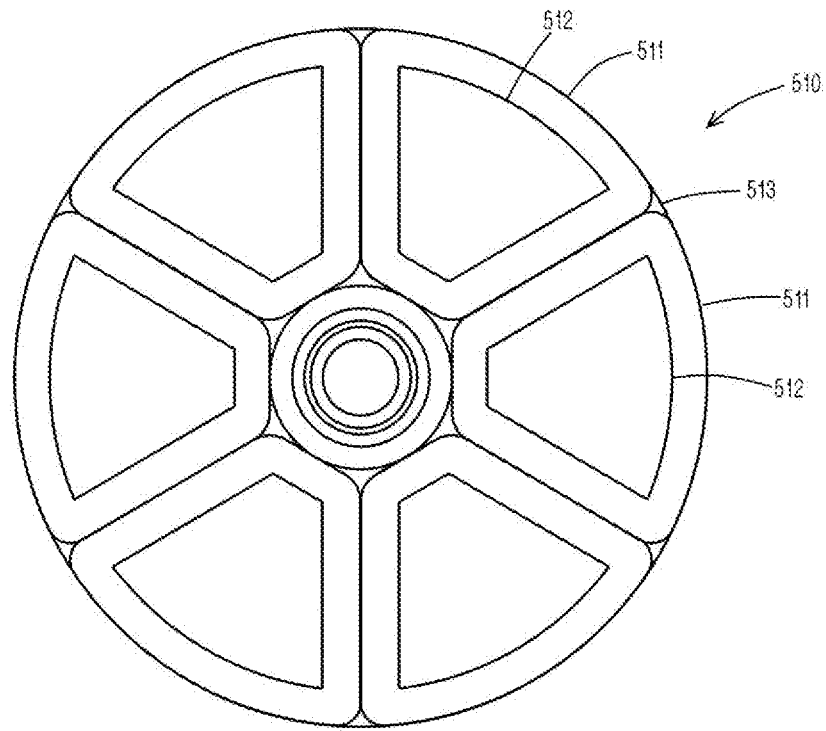
FIG. 23 is a plan view of the configuration of an armature of the axial-gap electric motor in embodiment 5.

The armature 510 includes armature coils 511, teeth parts 512, and a yoke part 513. FIG. 23 is a plan view of the configuration of the armature 510. The yoke part 513 has a disk shape, and the plurality of substantially fan-shaped teeth parts 512 protrude in the axial direction from one surface thereof so as to be arranged in equal intervals in the circumferential direction.

The yoke part 513 and the teeth parts 512 are integrally formed to constitute an armature member 515. This armature member 515 is constituted of a soft-magnetic material, such as soft iron or a soft ferrite. The teeth parts 512 are each substantially fan-shaped in a plan view, and an armature coil 511 is formed by winding a conductor wire in each of the teeth parts 512. Six armature coils 511 are disposed in the circumferential direction.

Next, the configuration of the rotor 520 is described. As shown in FIG. 22, the rotor 520 is disposed so as to face the armature 510 in the axial direction. This rotor 520 includes a plurality of pole blocks 521 and has a structure in which these pole blocks 521 are arranged in the circumferential direction.

Figure 24:
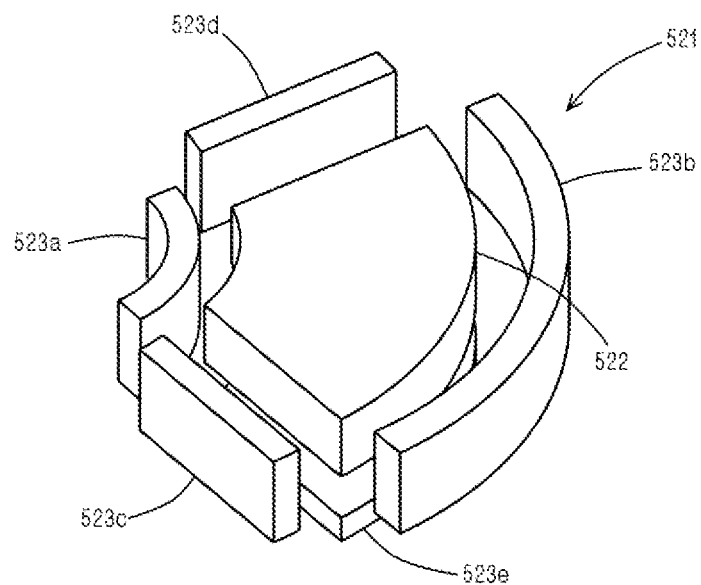
FIG. 24 is an exploded slant view of the configuration of a pole block of the axial-gap electric motor in embodiment 5.

FIG. 24 is an exploded slant view of the configuration of a pole block 521. The pole block 521 has a plate shape having an annular fan shape, when viewed from the axial direction, and includes: an iron core 522 constituted of a soft-magnetic material having a plate shape having an annular fan shape; and five plate-shaped permanent magnets 523a to 523e. The permanent magnet 523a has a circular-arc plate shape having an outer diameter equal to the diameter of the inner circular-arc surface of the iron core 522, and is attached to the inner circular-arc surface of the iron core 522 so as to hide the surface. The permanent magnet 523b has a circular-arc plate shape having an inner diameter equal to the diameter of the outer circular-arc surface of the iron core 522, and is attached to the outer circular-arc surface of the iron core 522 so as to hide the surface. The permanent magnets 523c and 523d each have a width equal to or slightly larger than the thickness of the iron core and are attached respectively to lateral surfaces of the iron core 522 so as to hide the surfaces. The permanent magnet 523e has main surfaces of an annular fan shape having a size equal to or slightly larger than that of one surface of the iron core 522, and is attached to one annular-fan-shape surface of the iron core 522 so as to hide the surface. That is, the permanent magnets 523a to 523e are attached to the iron core 522 so as to surround the iron core 522, with one annular-fan-shape main surface thereof remaining open. The permanent magnets 523a to 523e are disposed such that the magnetic poles thereof facing the iron core 522 are equal in polarity. The open surface of the iron core 522 is a rotor pole 524. As described below, the rotor pole 524 has the same polarity as those in the surfaces of the permanent magnets 523a to 523e which face the iron core 522. Those surfaces of the permanent magnets 523a to 523e which face outward (the surfaces on the side opposite to the iron core 522) have the polarity opposite to that of the rotor pole 524.

Figure 25:
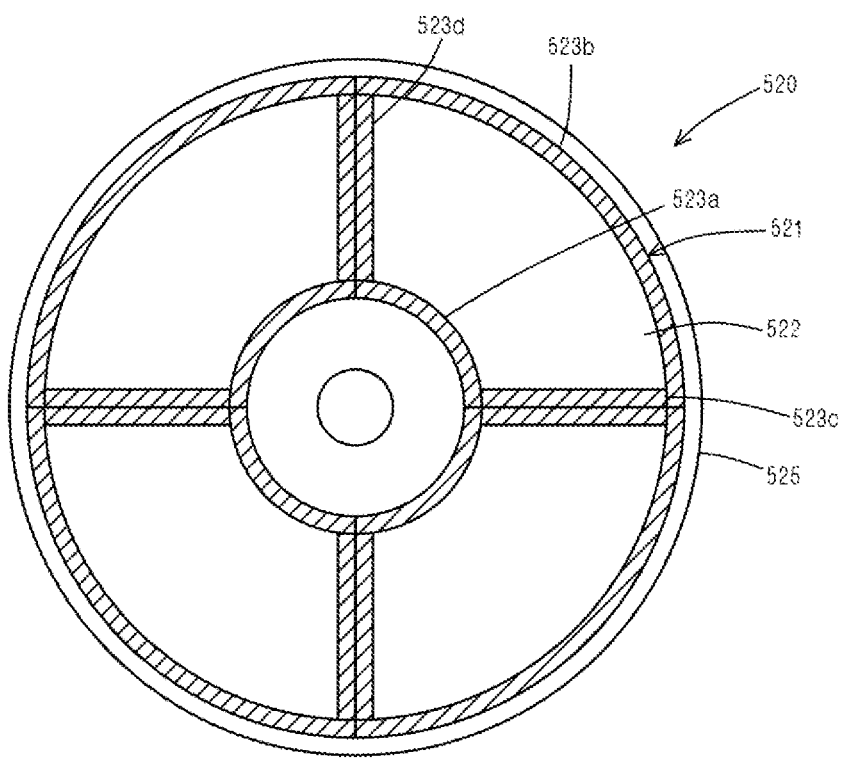
FIG. 25 is a bottom view of the configuration of a rotor of the axial-gap electric motor in embodiment 5.

FIG. 25 is a bottom view of the configuration of the rotor 520. The pole blocks 521 each having an annular-fan-plate shape are connected to each other such that lateral surfaces thereof are in contact with each other. In any two adjoining pole blocks 521, the rotor poles 524 differ in polarity from each other. That is, the pole blocks 521 are arranged in the circumferential direction such that polarity inversion occurs alternately over the rotor poles 524. Because of this, in any two adjoining pole blocks 521, one of the surfaces is an S pole and the other is an N pole. The two adjoining pole blocks 521 hence attract each other by magnetic force. It is therefore possible to easily dispose the plurality of pole blocks 521 in the circumferential direction.

The structure including the plurality of pole blocks 521 thus arranged is encased in a yoke 525 constituted of a disk-shaped soft-magnetic material in which one axial-direction surface has a circular recess. Consequently, the magnetic poles of the pole blocks 521 other than the rotor poles 524 are not exposed, and hence, magnetic paths are formed within the yoke 525.

As shown in FIG. 22, the surface of the rotor pole 524 of each iron core 522 has a radial-direction length which is the same as the radial-direction length of the teeth parts 512. Because of this, all the magnetic fluxes generated by the armature 510 go into and come out of the rotor poles 524 without leaking. The permanent magnets 523a and 523b are disposed so as to face the armature coils 511 in the axial direction. The spaces adjoining the armature coils 511 in the axial direction in conventional techniques were spaces not contributing to torque generation. In the axial-gap electric motor 500 in this embodiment, however, the permanent magnets 523a and 523b can be disposed in these spaces to attain an improvement in magnetic efficiency.

Figure 26:
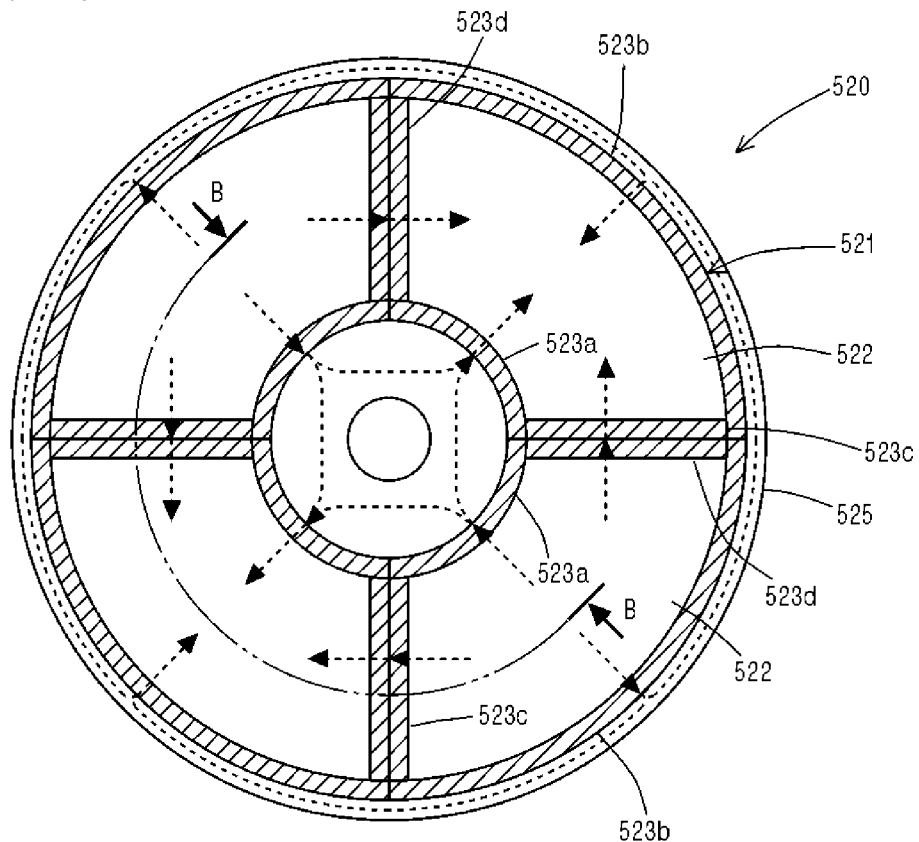
FIG. 26 is a bottom view for explaining magnetic paths in the rotor of the axial-gap electric motor in embodiment 5.
Figure 27:
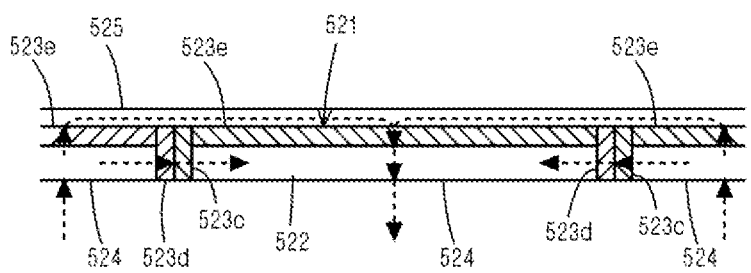
FIG. 27 is a cross-sectional view taken on the line B-B in FIG. 26.

FIG. 26 and FIG. 27 are views for explaining magnetic paths in the rotor 520; FIG. 26 is a bottom view of the rotor 520, and FIG. 27 is a cross-sectional view taken on the line B-B in FIG. 26. In FIG. 26 and FIG. 27, the arrows indicate magnetization directions, and the polarity is S→N. Each iron core 522 is magnetized by the permanent magnets 523a to 523e surrounding the iron core 522. Magnetic fluxes that come out of the permanent magnets 523a to 523e in which the S poles face an iron core 522 travel through the iron core 522. Since five surfaces of the iron core 522 have the permanent magnets 523a to 523e attached thereto, the magnetic fluxes that come out of the five permanent magnets 523a to 523e travel through the inside of the iron core 522, go in the axial direction (forward), and come out through the rotor pole 524 into the outside space (gap between the rotor 520 and the armature 510). The magnetic fluxes radially separate in the circumferential direction and the radial direction, and some of the separated magnetic fluxes enter the inside of the iron cores 522 of the adjoining pole blocks 521 through the rotor poles 524 thereof having an N pole. The remainder of the separated magnetic fluxes enter the yoke 525 and return to the permanent magnets 523a, 523b, and 523e. Each iron core 522 having a rotor pole 524 having an N pole receives magnetic fluxes from the two adjoining pole blocks 521. Since the N poles of the permanent magnets 523a to 523e face this iron core 522, the magnetic fluxes further travel through the inside of this iron core 522, separate into the radial-direction outside and inside, circumferential-direction both sides, and backside, and enter the permanent magnets 523a to 523e. From the permanent magnets 523c and 523d, the magnetic fluxes return to the adjoining permanent magnets 523c and 523d. The magnetic fluxes that come out of the permanent magnets 523a, 523b, and 523e travel through the yoke 525, and some of the magnetic fluxes enter the permanent magnets 523a, 523b, and 523e of the adjoining pole blocks 521. The remainder thereof come out of the yoke 525 to the outside and go toward the armature 510.

Each rotor pole 524 has the same polarity as those in the surfaces of the permanent magnets 523a to 523e which face the iron core 522 including the rotor pole 524. That is, in the case where the S poles of permanent magnets 523a to 523e face an iron core 522, the rotor pole 524 of this iron core 522 is an S pole. In the case where the N poles of permanent magnets 523a to 523e face an iron core 522, the rotor pole 524 of this iron core 522 is an N pole.

Figure 28:
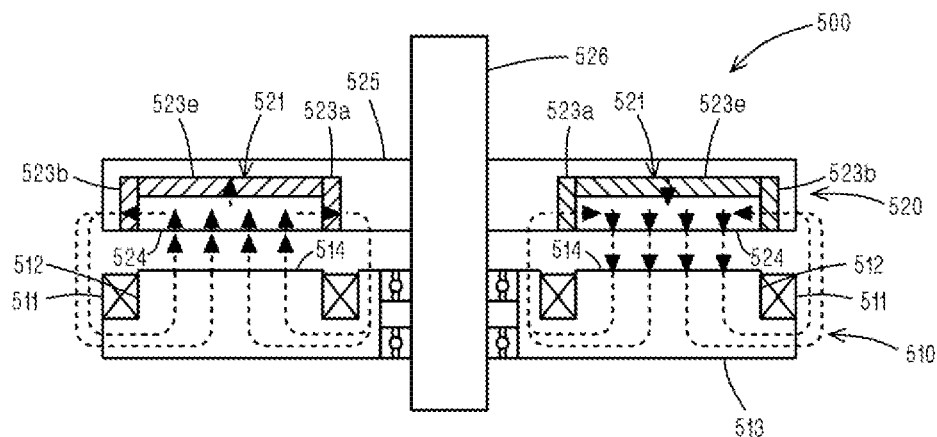
FIG. 28 is a cross-sectional side view showing magnetic paths generated by armature coils of the axial-gap electric motor in embodiment 5.

When a current is allowed to flow through the armature coils 511 in the axial-gap electric motor 500 having such configuration, a magnetic field is generated around each armature coil 511. FIG. 28 is a cross-sectional side view showing magnetic paths generated by armature coils 511. Circular magnetic paths are formed around each cross-section of the armature coil 511. In this armature 510, that surface of each teeth part 512 which faces the rotor 520 is a magnetic pole (armature pole 514).

Magnetic fluxes generated by an armature coil 511 enter an iron core 522 through the rotor pole 524 via the gap and pass through the permanent magnets 523a to 523d. The magnetic fluxes that pass through the permanent magnets 523a and 523b come out through the yoke 525 into the air, enter the yoke part 513, pass through the outside of the armature coil 511, and return to the armature pole 514 having an S pole. Meanwhile, the magnetic fluxes that have passed through the permanent magnets 523c and 523d enter the iron cores 522 of the adjoining pole blocks 521 via permanent magnets 523c and 523d thereof, come out into the gap through the rotor poles 524 having an S pole, and enter the armature poles 514 having an N pole and facing the rotor poles 524. Some of the magnetic fluxes generated by the armature coil 511 may or may not pass through the permanent magnet 523e. Whether the magnetic fluxes pass through the permanent magnet 523e depends on the configuration of the axial-gap electric motor 500. For example, in cases when the iron core 522 has a small axial-direction dimension and the distance between the armature pole 514 and the permanent magnet 523e is short, then some of the generated magnetic fluxes that have come out of the armature pole 514 are apt to pass through the permanent magnet 523e. In the case where the iron core 522 has a large axial-direction dimension and the distance between the armature pole 514 and the permanent magnet 523e is long, then the generated magnetic fluxes that have come out of the armature pole 514 are less apt to pass through the permanent magnet 523e. In the axial-gap electric motor 500 in this embodiment, since each iron core 522 is surrounded by the permanent magnets 523a to 523e, the magnetic fluxes passing through the rotor poles 524 are enhanced as compared with those in the rotor of the conventional structure in which permanent magnets having an annular-fan-plate shape are disposed so as to face an armature. Consequently, the axial-gap electric motor 500 has an improved magnetic efficiency.

Embodiment 6

In this embodiment, an explanation is given on a double-stator type axial-gap electric motor including: a rotor having a disk shape and including magnetic poles in both surfaces thereof; and armatures disposed respectively on both sides of the rotor so as to leave a specific gap therebetween.

Figure 29:
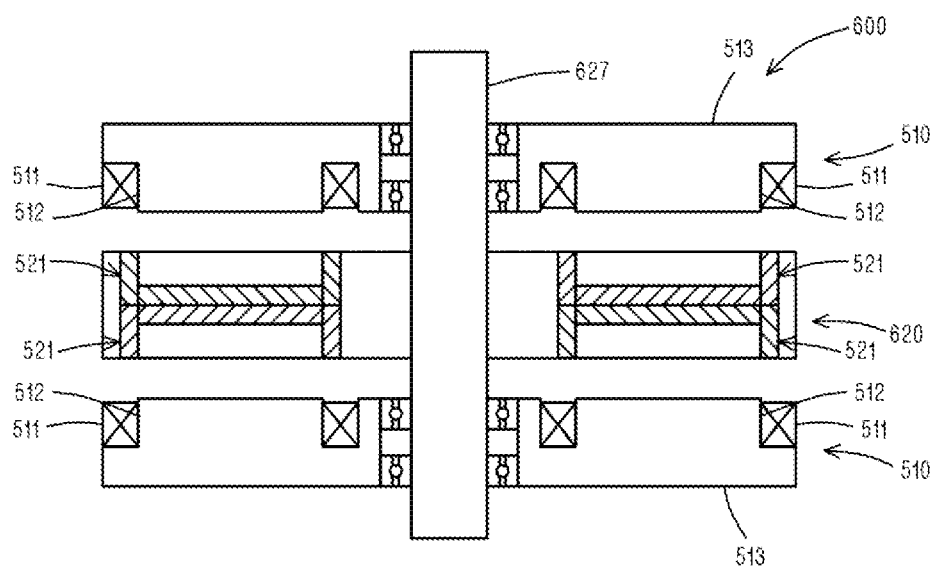
FIG. 29 is a cross-sectional side view of the configuration of an axial-gap electric motor in embodiment 6.

FIG. 29 is a cross-sectional side view of the configuration of the axial-gap electric motor in this embodiment. The axial-gap electric motor 600 includes armatures 510 and a rotor 620 as a mover. The rotor 620 has a rotating shaft 627 and is rotatable on the rotating shaft 627. The axial-gap electric motor 600 in this embodiment includes the armatures 510 disposed respectively on both sides of the rotor 620 in the axial direction, the armatures 510 each having the same configuration as in embodiment 5.

The configuration of the rotor 620 is described. As shown in FIG. 29, the rotor 620 is disposed so as to face the armatures 510 in the axial direction. The rotor 620 includes a plurality of pole blocks 521 and has a structure in which the pole blocks 521 are arranged in the circumferential direction in both surfaces thereof in the axial direction. The pole blocks 521 have the same configuration as the pole blocks 521 described above in embodiment 5. Hence, same constituent elements are designated by same numerals and explanations thereof are omitted.

Figure 30:
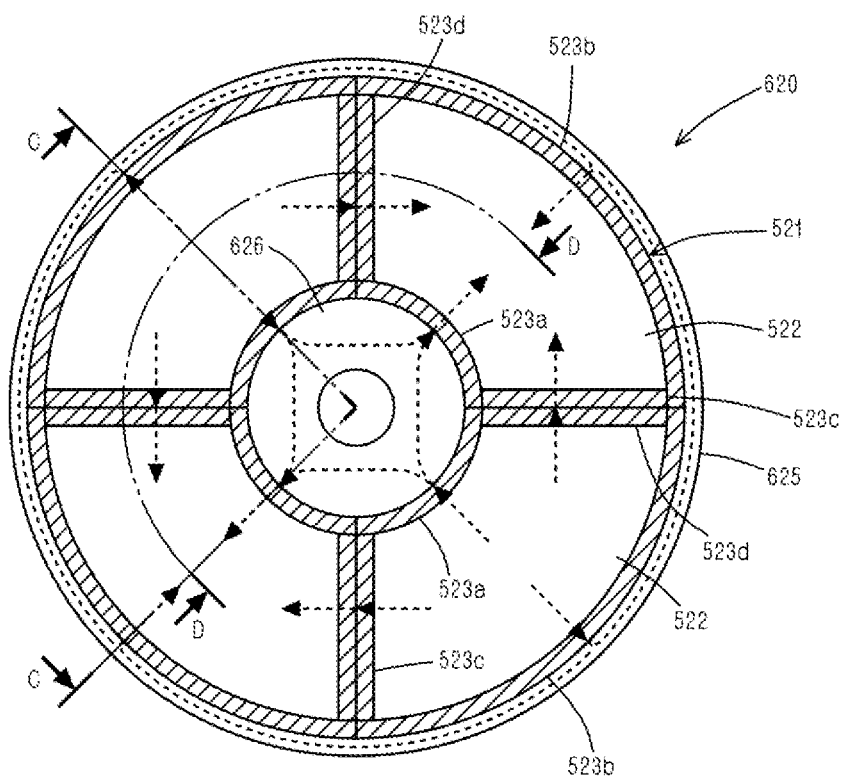
FIG. 30 is a plan view of the configuration of a rotor of the axial-gap electric motor in embodiment 6.
Figure 31:
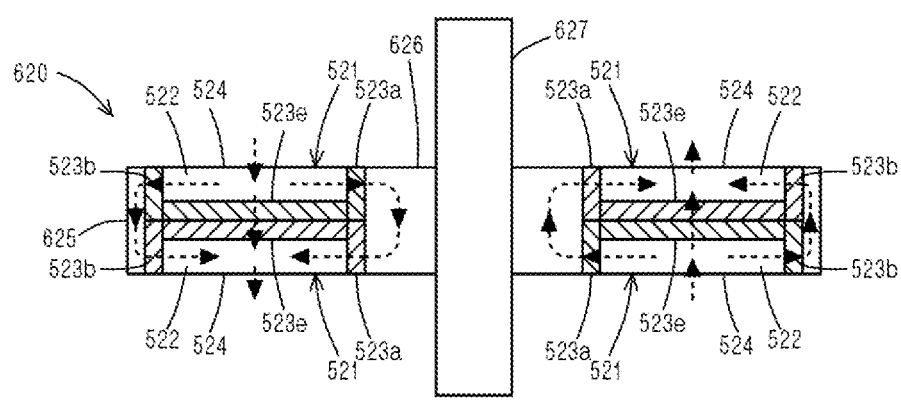
FIG. 31 is a cross-sectional view taken on the lines C-C in FIG. 30.
Figure 32:
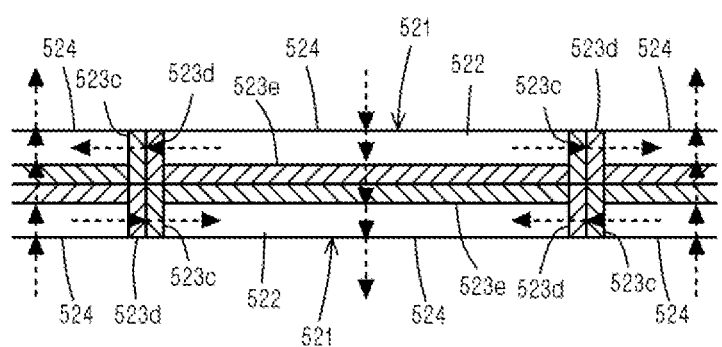
FIG. 32 is a cross-sectional view taken on the line D-D in FIG. 30.

FIG. 30 is a plan view of the configuration of the rotor 620, FIG. 31 is a cross-sectional view taken on the lines C-C in FIG. 30, and FIG. 32 is a cross-sectional view taken on the line D-D in FIG. 30. The pole blocks 521 each having an annular-fan-plate shape are connected to each other such that lateral surfaces thereof are in contact with each other, thereby configuring two disks. These disks are bonded to each other by adhering permanent magnets 523e of one disk to permanent magnets 523e of the other. Here, the S-pole surfaces of the permanent magnets 523e of one of the two disks are bonded to the N-pole surfaces of the permanent magnets 523e of the other. That is, this rotor 620 has a configuration produced by removing the yoke 525 from the rotor 520 described above in embodiment 5 and bonding two such remaining portions to each other by back-to-back bonding. A ring-shaped yoke 625 is disposed on the periphery of such structure configured of the two disks bonded to each other. A ring-shaped yoke 626 attached to the rotating shaft 627 is disposed inside the structure to configure the rotor 620.

In FIG. 30 to FIG. 32, magnetic paths in and around the rotor 620 are shown. In FIG. 30 to FIG. 32, the arrows indicate magnetization directions, and the polarity is S→N. Each iron core 522 is magnetized by the permanent magnets 523a to 523e surrounding the iron core 522. Magnetic fluxes that come out of the permanent magnets 523a to 523e in which the S poles face an iron core 522 travel through the iron core 522. Since five surfaces of the iron core 522 have the permanent magnets 523a to 523e attached thereto, the magnetic fluxes that come out of the five permanent magnets 523a to 523e travel through the inside of the iron core 522, go in the axial direction (forward), and come out through the rotor pole 524 into the outside space (gap between the rotor 620 and an armature 510). Most of the magnetic fluxes separate in the circumferential direction and enter the inside of the iron cores 522 of the adjoining pole blocks 521 through the rotor poles 524 thereof having an N pole. Since the N poles of permanent magnets 523a to 523e face each of the iron cores 522 having a rotor pole 524 having an N pole, the magnetic fluxes further travel through the inside of this iron core 522, separate into the radial-direction outside and inside, circumferential-direction both sides, and axial direction, and enter the permanent magnets 523a to 523e. From the permanent magnets 523c and 523d, the magnetic fluxes go into the adjoin permanent magnets 523c and 523d, respectively. From the permanent magnet 523e, the magnetic fluxes go into the adjoining permanent magnet 523e. The magnetic fluxes that come out of the permanent magnets 523a and 523b travel through the yokes 625 and 626 and enter the permanent magnets 523a and 523b which adjoin the permanent magnets 523a and 523b in the axial direction, respectively.

Each rotor pole 524 has the same polarity as those in the surfaces of the permanent magnets 523a to 523e which face the iron core 522 including the rotor pole 524. That is, in the case where the S poles of permanent magnets 523a to 523e face an iron core 522, the rotor pole 524 of this iron core 522 is an S pole. In the case where the N poles of permanent magnets 523a to 523e face an iron core 522, the rotor pole 524 of this iron core 522 is an N pole.

Figure 33:
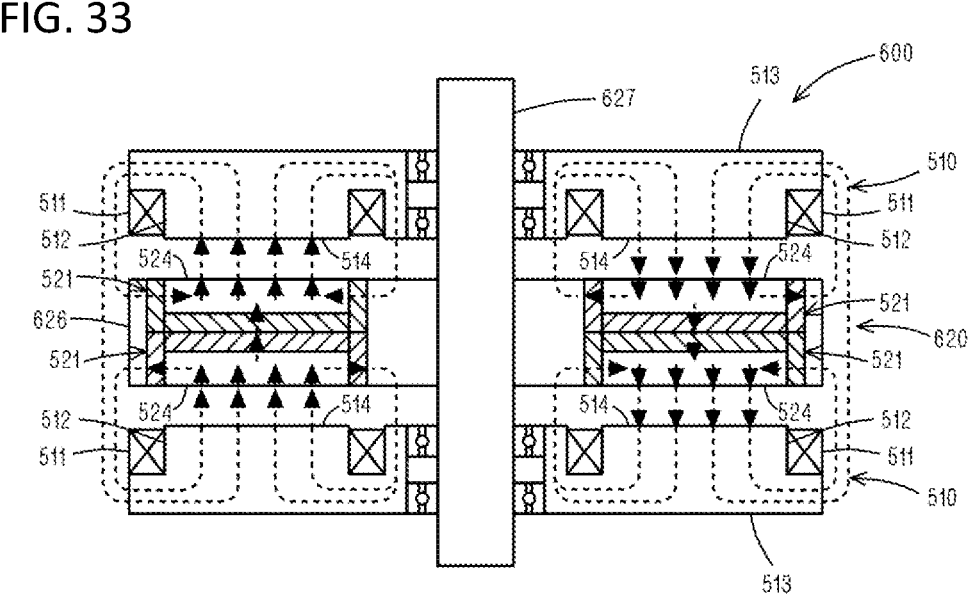
FIG. 33 is a cross-sectional side view showing magnetic paths generated by armature coils of the axial-gap electric motor in embodiment 6.

When a current is allowed to flow through the armature coils 511 in the axial-gap electric motor 600 having such configuration, a magnetic field is generated around each armature coil 511. FIG. 33 is a cross-sectional side view showing magnetic paths generated by armature coils 511. Circular magnetic paths are formed around each cross-section of the armature coil 511. In the armatures 510 in this state, that surface of each teeth part 512 which faces the rotor 620 is a magnetic pole (armature pole 514).

Magnetic fluxes generated by an armature coil 511 enter an iron core 522 through the rotor pole 524 via the gap and pass through the permanent magnets 523a to 523d. The magnetic fluxes that have passed through the permanent magnets 523a and 523b come out through the yokes 625 and 626 into the air, enter the yoke part 513, pass through the outside of the armature coil 511, and return to the armature pole 514 having an S pole. Meanwhile, the magnetic fluxes that have passed through the permanent magnets 523c and 523d enter the iron cores 522 of the adjoining pole blocks 521 via permanent magnets 523c and 523d thereof, come out into the gap through the rotor poles 524 having an S pole, and enter the armature poles 514 having an N pole and facing the rotor poles 524. Some of the magnetic fluxes generated by the armature coil 511 may or may not pass through the permanent magnet 523e. Whether the magnetic fluxes pass through the permanent magnet 523e depends on the configuration of the axial-gap electric motor 600. For example, in the case where the iron core 522 has a small axial-direction dimension and the distance between the armature pole 514 and the permanent magnet 523e is short, then some of the generated magnetic fluxes that come out of the armature pole 514 are apt to pass through the permanent magnet 523e. In the case where the iron core 522 has a large axial-direction dimension and the distance between the armature pole 514 and the permanent magnet 523e is long, then the generated magnetic fluxes that come out of the armature pole 514 are less apt to pass through the permanent magnet 523e. In the axial-gap electric motor 600 in this embodiment, since each iron core 522 is surrounded by the permanent magnets 523a to 523e, the magnetic fluxes passing through the rotor poles 524 are enhanced as compared with those in the rotor of the conventional structure in which permanent magnets having an annular-fan-plate shape are disposed so as to face armatures. Consequently, the axial-gap electric motor 600 has an improved magnetic efficiency.

Other Embodiments

Figure 34:
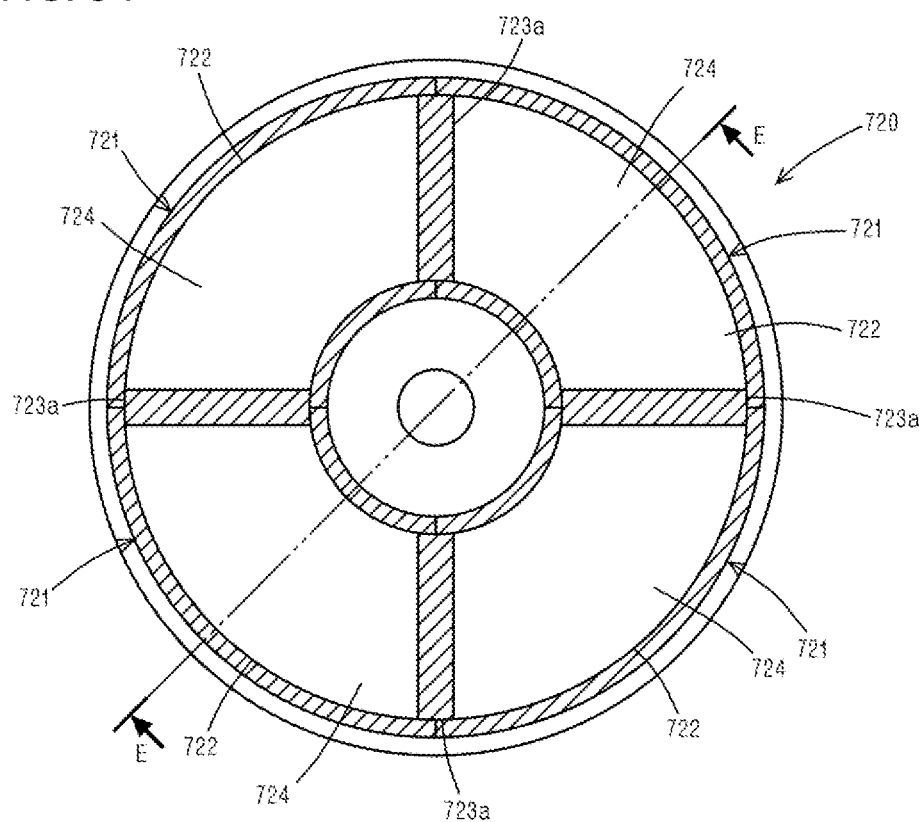
FIG. 34 is a plan view showing a modification of the configuration of a mover of a double-stator type axial-gap electric motor.
Figure 35:
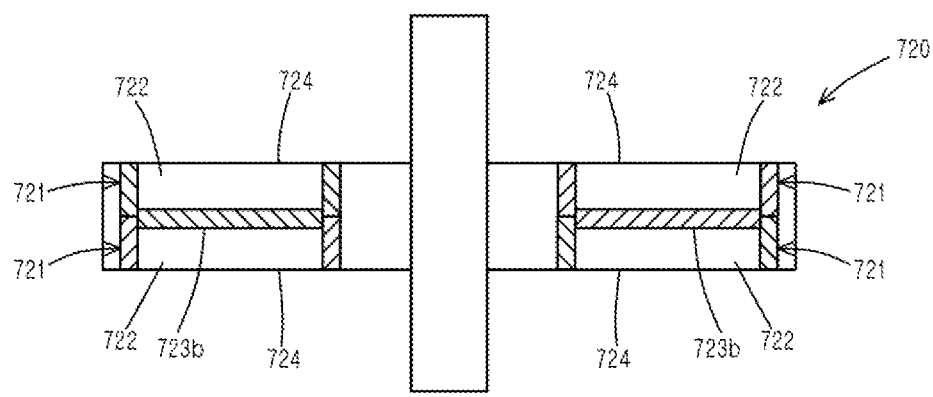
FIG. 35 is a cross-sectional view taken on the line E-E in FIG. 34.

Embodiments 1 to 6 described above each has a configuration in which the pole blocks each includes its own permanent magnets. However, the present invention is not limited to such configurations. The electric motor may have a configuration in which adjoining pole blocks share one permanent magnet. FIG. 34 is a plan view showing a modification of the configuration of the mover in a double-stator type axial-gap electric motor, and FIG. 35 is a cross-sectional view taken on the line E-E in FIG. 34. As shown in FIG. 34, in the rotor 720 shown in this modification, plate-shaped permanent magnets 723a extending in axial directions are shared by pole blocks 721 which adjoin each other in the circumferential direction. That is, one permanent magnet 723a is disposed between two iron cores 722 which adjoin each other in the circumferential direction. The S-pole surface of this permanent magnet 723a is bonded to one iron core 722, and the rotor pole 724 of this iron core 722 is an S pole. Meanwhile, the N-pole surface of the permanent magnet 723a is bonded to the other iron core 722, and the rotor pole 724 of this iron core 722 is an N pole. Furthermore, as shown in FIG. 35, in this rotor 720 shown in this modification, permanent magnets 723b having an annular-fan-plate shape also are each shared by pole blocks 721 which adjoin each other in the axial direction. Specifically, one permanent magnet 723b is disposed between two iron cores 722 which adjoin each other in the axial direction. The S-pole surface of this permanent magnet 723b is bonded to one iron core 722, and the rotor pole 724 of this iron core 722 is an S pole. Meanwhile, the N-pole surface of the permanent magnet 723b is bonded to the other iron core 722, and the rotor pole 724 of this iron core 722 is an N pole.

INDUSTRIAL APPLICABILITY

The electric motor of the present invention is useful as an electric motor including a mover equipped with permanent magnets.

REFERENCE SIGNS LIST

100, 200, 300: Direct-acting electric motor
400: Radial-gap electric motor
500, 600: Axial-gap electric motor
110, 210, 310, 410, 510: Armature
111, 211, 311, 411, 511: Armature coil
112, 212, 312, 412, 512: Teeth part
114, 214, 314, 414, 514: Armature pole
120, 220, 320: Mover
420, 520, 620: Rotor
121, 421, 521: Pole block
122, 422, 522: Iron core
123, 423a to 423e, 523a to 523e: Permanent magnet
124: Mover pole
424, 524: Rotor pole

The invention claimed is:

1. An electric motor, comprising:
an armature including an armature coil; and
a mover including a plurality of pole blocks each including an iron core disposed to face the armature and a plurality of permanent magnets which surround the iron core such that a surface of the iron core, which faces the armature, is open,
wherein the plurality of permanent magnets in each pole block are disposed such that magnetic poles thereof facing the iron core are equal in polarity,
wherein the plurality of pole blocks are disposed such that magnetic poles thereof differing in polarity are arranged periodically,
wherein the plurality of pole blocks are disposed such that polarities of the pole blocks are inverted one by one in a moving direction of the mover, and
wherein the plurality of pole blocks are disposed such that the polarities of the pole blocks are inverted one by one in a direction which crosses the moving direction.

2. The electric motor according to claim 1, wherein each of the pole blocks is configured of the iron core and the permanent magnets attached respectively to five surfaces of the iron core, the iron core having a rectangular parallelepiped shape,
the moving direction is a linear direction, and
the plurality of pole blocks are arranged in the moving direction such that each of the magnetic poles faces in one direction which crosses the moving direction.

3. The electric motor according to claim 1, wherein each of the pole blocks is configured of the iron core and the permanent magnets attached respectively to five surfaces of the iron core other than an outer circular-arc surface, the iron core having a shape of a fan-shaped plate from which a tip portion is removed,
the mover has a rotating shaft and is rotatable in the moving direction which is a circular direction the center of which is the rotating shaft, and
the plurality of pole blocks are arranged in the moving direction such that each of the magnetic poles faces outward in a radial direction of the rotating shaft.

4. The electric motor according to claim 1, wherein each of the pole blocks is configured of the iron core and the permanent magnets attached respectively to five surfaces of the iron core other than one fan-shaped surface thereof, the iron core having a shape of a fan-shaped plate from which a tip portion is removed,
the mover has a rotating shaft and is rotatable in the moving direction which is a circular direction the center of which is the rotating shaft, and
the plurality of pole blocks are arranged in the moving direction such that each of the magnetic poles faces in one direction parallel with the rotating shaft.

5. An electric motor, comprising:
an armature including an armature coil; and
a mover including a plurality of pole blocks each including an iron core disposed to face the armature and a plurality of permanent magnets which surround the iron core such that a surface of the iron core, which faces the armature, is open,
wherein the plurality of permanent magnets in each pole block are disposed such that magnetic poles thereof facing the iron core are equal in polarity,
wherein the plurality of pole blocks are disposed such that magnetic poles thereof differing in polarity are arranged periodically,
wherein the plurality of pole blocks are disposed such that polarities of the pole blocks are inverted one by one in a moving direction of the mover, and
wherein the plurality of pole blocks are disposed such that magnetic poles equal in polarity are arranged in a direction which crosses the moving direction.

6. The electric motor according to claim 5, wherein each of the pole blocks is configured of the iron core and the permanent magnets attached respectively to five surfaces of the iron core, the iron core having a rectangular parallelepiped shape,
the moving direction is a linear direction, and
the plurality of pole blocks are arranged in the moving direction such that each of the magnetic poles faces in one direction which crosses the moving direction.

7. The electric motor according to claim 5, wherein each of the pole blocks is configured of the iron core and the permanent magnets attached respectively to five surfaces of the iron core other than an outer circular-arc surface, the iron core having a shape of a fan-shaped plate from which a tip portion is removed,
the mover has a rotating shaft and is rotatable in the moving direction which is a circular direction the center of which is the rotating shaft, and
the plurality of pole blocks are arranged in the moving direction such that each of the magnetic poles faces outward in a radial direction of the rotating shaft.

8. The electric motor according to claim 5, wherein each of the pole blocks is configured of the iron core and the permanent magnets attached respectively to five surfaces of the iron core other than one fan-shaped surface thereof, the iron core having a shape of a fan-shaped plate from which a tip portion is removed,
the mover has a rotating shaft and is rotatable in the moving direction which is a circular direction the center of which is the rotating shaft, and
the plurality of pole blocks are arranged in the moving direction such that each of the magnetic poles faces in one direction parallel with the rotating shaft.

9. An electric motor, comprising:
an armature including an armature coil; and
a mover including a plurality of pole blocks each including an iron core disposed to face the armature and a plurality of permanent magnets which surround the iron core such that a surface of the iron core, which faces the armature, is open,
wherein the plurality of permanent magnets in each pole block are disposed such that magnetic poles thereof facing the iron core are equal in polarity,
the plurality of pole blocks are disposed such that magnetic poles thereof differing in polarity are arranged periodically,
the plurality of pole blocks are disposed such that polarities of the pole blocks are inverted one by one in a moving direction of the mover,
each of the pole blocks is configured of the iron core and the permanent magnets attached respectively to five surfaces of the iron core, the iron core having a rectangular parallelepiped shape,
the moving direction is a linear direction, and
the plurality of pole blocks are arranged in the moving direction such that each of the magnetic poles faces in one direction which crosses the moving direction.

10. An electric motor, comprising:
an armature including an armature coil; and
a mover including a plurality of pole blocks each including an iron core disposed to face the armature and a plurality of permanent magnets which surround the iron core such that a surface of the iron core, which faces the armature, is open,
wherein the plurality of permanent magnets in each pole block are disposed such that magnetic poles thereof facing the iron core are equal in polarity,
the plurality of pole blocks are disposed such that magnetic poles thereof differing in polarity are arranged periodically,
the plurality of pole blocks are disposed such that polarities of the pole blocks are inverted one by one in a moving direction of the mover,
each of the pole blocks is configured of the iron core and the permanent magnets attached respectively to five surfaces of the iron core other than one fan-shaped surface thereof, the iron core having a shape of a fan-shaped plate from which a tip portion is removed,
the mover has a rotating shaft and is rotatable in the moving direction which is a circular direction the center of which is the rotating shaft, and
the plurality of pole blocks are arranged in the moving direction such that each of the magnetic poles faces in one direction parallel with the rotating shaft.

* * * * *